(12) United States Patent
Seiss et al.

(10) Patent No.: US 12,070,138 B2
(45) Date of Patent: Aug. 27, 2024

(54) METHOD FOR TEMPERATURE MONITORING AND REGULATION AND SYSTEMS THEREFOR

(71) Applicant: Electrolux Professional, Inc., Vicksburg, MS (US)

(72) Inventors: Rick Seiss, Madison, MS (US); Arthur Delorenzo, Mt. Pleasant, MI (US); Sakthivel Sandhalingam, Bangalore (IN); Ryan McMartin, Weidman, MI (US); Gautham Ramamurthy, Bangalore (IN); Athikamannil Lankayil Ajay, Bengaluru (IN); Begoor Gundurao Chetan, Bengaluru (IN)

(73) Assignee: Electrolux Professional, Inc., Vicksburg, MS (US)

( * ) Notice: Subject to any disclaimer, the term of this patent is extended or adjusted under 35 U.S.C. 154(b) by 0 days.

(21) Appl. No.: 18/205,975

(22) Filed: Jun. 5, 2023

(65) Prior Publication Data

US 2023/0389722 A1    Dec. 7, 2023

Related U.S. Application Data

(63) Continuation of application No. 16/716,253, filed on Dec. 16, 2019, now Pat. No. 11,666,160, which is a
(Continued)

(51) Int. Cl.
*A47F 3/04* (2006.01)
*A47F 3/14* (2006.01)
(Continued)

(52) U.S. Cl.
CPC .......... *A47F 3/0478* (2013.01); *A47F 3/0426* (2013.01); *A47F 3/0486* (2013.01);
(Continued)

(58) Field of Classification Search
CPC ...... A47F 10/06; A47F 3/0404; A47F 3/0478; A47F 3/0486; G06Q 10/08; G06Q 10/087;
(Continued)

(56) References Cited

U.S. PATENT DOCUMENTS

| | | | |
|---|---|---|---|
| 3,881,462 | A | 5/1975 | Barnett |
| 4,568,201 | A | 2/1986 | Noda |

(Continued)

FOREIGN PATENT DOCUMENTS

| | | |
|---|---|---|
| AU | 2014202504 A1 | 11/2014 |
| CN | 201819507 U | 5/2011 |

(Continued)

OTHER PUBLICATIONS

US 11,026,523 B2, 06/2021, Seiss et al. (withdrawn)
(Continued)

*Primary Examiner* — Henry T Crenshaw
(74) *Attorney, Agent, or Firm* — Kutak Rock LLP

(57) ABSTRACT

A monitoring and control system is provided. The system includes a plurality of sensors for obtaining readings associated with food items, such as temperature readings, freshness indications, and the like. The system is scalable and configurable with each sensor being capable of functioning as an individual sensor and/or as part of a grouping of sensors. The system is configured to obtain a variety of information, such as ambient air temperature, dwell time of food items, moisture levels, and the like, thereby enabling the system to recognize current and future concerns. The system provides audio and visual warnings and visual displays. In some embodiments, the system performs one or more physical operation based on one or more detected condition. The system is further configured to distinguish between accurate readings and inaccurate readings and/or to (Continued)

otherwise determine if an obstacle is preventing a sensor from obtaining an accurate reading.

19 Claims, 28 Drawing Sheets

Related U.S. Application Data continuation-in-part of application No. 16/111,610, filed on Aug. 24, 2018, now Pat. No. 11,191,370.

(60) Provisional application No. 62/549,769, filed on Aug. 24, 2017, provisional application No. 62/629,782, filed on Feb. 13, 2018, provisional application No. 62/646,630, filed on Mar. 22, 2018, provisional application No. 62/779,626, filed on Dec. 14, 2018, provisional application No. 62/814,847, filed on Mar. 6, 2019, provisional application No. 62/818,084, filed on Mar. 13, 2019, provisional application No. 62/852,848, filed on May 24, 2019.

(51) Int. Cl.
  *A47F 7/00* (2006.01)
  *A47J 36/24* (2006.01)
  *G01K 3/00* (2006.01)
  *G01K 13/00* (2021.01)

(52) U.S. Cl.
  CPC ............ *A47F 3/145* (2013.01); *A47F 7/0071* (2013.01); *A47J 36/24* (2013.01); *G01K 3/005* (2013.01); *G01K 13/00* (2013.01); *G01K 2207/02* (2013.01)

(58) Field of Classification Search
  CPC ...... G06Q 30/0281; G06Q 50/12; G07F 9/02; G07F 9/10; G07G 1/0036; G07G 1/14; G09F 23/00; G09F 23/06; G09F 27/00
  See application file for complete search history.

(56) References Cited

U.S. PATENT DOCUMENTS

| | | | |
|---|---|---|---|
| 5,243,171 | A | 9/1993 | Wood et al. |
| 5,412,297 | A | 5/1995 | Clark et al. |
| 5,530,229 | A | 6/1996 | Gong et al. |
| 5,746,114 | A | 5/1998 | Harris |
| 5,893,051 | A | 4/1999 | Tomohiro |
| 5,900,801 | A | 5/1999 | Heagle et al. |
| 5,939,974 | A | 8/1999 | Heagle et al. |
| 6,132,084 | A | 10/2000 | Whipple, III et al. |
| 6,155,160 | A | 12/2000 | Hochbrueckner |
| 6,274,856 | B1 | 8/2001 | Clothier et al. |
| 6,299,920 | B1 | 10/2001 | Saksena |
| 6,304,178 | B1 | 10/2001 | Hayashida |
| 6,411,916 | B1 | 6/2002 | Pellerin |
| 6,586,714 | B2 | 7/2003 | Kawamura et al. |
| 6,590,192 | B2 | 7/2003 | Taino et al. |
| 6,630,655 | B2 | 10/2003 | Fukunaga et al. |
| 6,675,591 | B2 | 1/2004 | Singh et al. |
| 6,817,757 | B1 | 11/2004 | Wallace |
| 6,856,247 | B1 | 2/2005 | Wallace |
| 7,038,172 | B1 | 5/2006 | Stuck |
| 7,157,675 | B2 | 1/2007 | Mura |
| 7,284,393 | B1 | 10/2007 | MacMillan |
| 7,372,003 | B2 | 5/2008 | Kates |
| 7,446,282 | B2 | 11/2008 | Shei et al. |
| 8,575,525 | B2 | 11/2013 | Mackay et al. |
| 8,931,400 | B1 | 1/2015 | Allen |
| 9,295,346 | B2 | 3/2016 | Bates et al. |
| 9,477,962 | B2 | 10/2016 | Worrall et al. |
| 9,534,938 | B1 | 1/2017 | Zhang et al. |
| 9,581,338 | B2 | 2/2017 | Yamanaka et al. |
| 11,191,370 | B2 | 12/2021 | Sandhalingam et al. |
| 11,666,160 | B2 | 6/2023 | Seiss et al. |
| 2002/0005406 | A1 | 1/2002 | Fukunaga et al. |
| 2002/0189462 | A1 | 12/2002 | Guess |
| 2002/0198793 | A1 | 12/2002 | Majd et al. |
| 2004/0065103 | A1 | 4/2004 | Monroe |
| 2005/0023991 | A1 | 2/2005 | Kemper |
| 2005/0031985 | A1 | 2/2005 | Burstyn et al. |
| 2005/0261991 | A1 | 11/2005 | Kennamer |
| 2007/0001860 | A1 | 1/2007 | Frost-Gaskin |
| 2008/0120188 | A1 | 5/2008 | Mobley et al. |
| 2009/0096617 | A1 | 4/2009 | Purcell et al. |
| 2011/0094160 | A1 | 4/2011 | Houser |
| 2013/0099715 | A1 | 4/2013 | Fuhge |
| 2013/0327070 | A1 | 12/2013 | Rees et al. |
| 2014/0291170 | A1 | 10/2014 | Goecks et al. |
| 2015/0161835 | A1 | 6/2015 | Jablokov et al. |
| 2015/0312964 | A1 | 10/2015 | Sorenson et al. |
| 2016/0029896 | A1* | 2/2016 | Lee ..................... A61B 5/7221 600/474 |
| 2017/0030135 | A1* | 2/2017 | Elie ......................... E05F 15/73 |
| 2017/0042373 | A1 | 2/2017 | Alexander et al. |
| 2017/0188741 | A1 | 7/2017 | Thomas et al. |
| 2017/0196375 | A1 | 7/2017 | Wallinder |
| 2017/0215231 | A1 | 7/2017 | Doerk et al. |
| 2017/0219279 | A1 | 8/2017 | Chae et al. |
| 2017/0261256 | A1 | 9/2017 | Delgadillo |
| 2017/0321948 | A1 | 11/2017 | Vitel |
| 2017/0332842 | A1* | 11/2017 | Laub ..................... A47F 10/06 |
| 2018/0103778 | A1 | 4/2018 | Olovsson |
| 2018/0140125 | A1 | 5/2018 | Luo et al. |
| 2018/0338354 | A1 | 11/2018 | Bassill et al. |
| 2019/0167014 | A1 | 6/2019 | Seiss et al. |
| 2019/0290021 | A1 | 9/2019 | Olesen |
| 2020/0138206 | A1 | 5/2020 | Seiss et al. |
| 2020/0181496 | A1 | 6/2020 | Lopez Fresno et al. |

FOREIGN PATENT DOCUMENTS

| | | |
|---|---|---|
| EP | 2941986 A1 | 11/2015 |
| EP | 2934242 | 11/2018 |
| GB | 2280829 A | 2/1995 |
| WO | 2005017476 | 2/2005 |
| WO | 2015168243 A1 | 11/2015 |
| WO | 2020124092 | 6/2020 |

OTHER PUBLICATIONS

US 11,058,236 B2, 07/2021, Seiss et al. (withdrawn)
"Corrected Notice of Allowability Received for U.S. Appl. No. 16/111,610, mailed on Aug. 12, 2021."
"Corrected Notice of Allowability Received for U.S. Appl. No. 16/111,610, mailed on Jun. 17, 2021."
"Final Office Action Received for U.S. Appl. No. 16/716,253, mailed on Nov. 12, 2021".
"International Preliminary Report on Patentability for International Application PCT/US2019/066633, Report issued Jun. 8, 2021, Mailed Jun. 24, 2021."
"International Search Report and Written Opinion for International Application No. PCT/US2019/066633, Search completed Apr. 23, 2020, Mailed Apr. 23, 2020, 08 Pgs".
"Non-Final Office Action Received for the U.S. Appl. No. 16/716,253, mailed on Apr. 1, 2022."
"Non-Final Office Action Received for U.S. Appl. No. 16/111,610, Mailed on May 21 2020".
"Non-Final Office Action Received for U.S. Appl. No. 16/716,253, Mailed on Jun. 3, 2021".
"Notice of Allowance received for U.S. Appl. No. 16/716,253, Mailed on Aug. 9, 2022".
"Notice of Allowance received for U.S. Appl. No. 16/111,610 , Mailed on Feb. 11, 2021."
"Notice of Allowance received for U.S. Appl. No. 16/716,253, Mailed on Nov. 15, 2022".
"Restriction Requirement Received for U.S. Appl. No. 16/111,610, mailed on Mar. 3, 2020, 6 pages".

(56) References Cited

OTHER PUBLICATIONS

Bonnani, et al., "Attention-Based Design of Augmented Reality Interfaces, Retrieved from Online on Jun. 23, 2017 (Jun. 23, 2017); Retrieved from URL: http://dl.acm.org/citation.cfm?id=1056883", Jun. 23, 2017.

* cited by examiner

| IDX | Region | Temperature Range | Alarm Reason |
|---|---|---|---|
| 1 | Low – Error Region | Below 32F | Lower than allowed limit |
| 2 | Low – Warning Region | 32F to 34F | In Lower warning zone |
| 3 | Ideal – Region | 34F to 38F | – NO alarm |
| 4 | High – Warning Region | 38F to 40F | In higher warning zone |
| 5 | High – Medium Error Region | 40F to 50F | Higher than allowed limit |
| 6 | High – Error Region | 50F and above | Higher than allowed limit |

| Idx No | - | - | - | - | n-9 | n-8 | n-7 | n-6 | n-5 | n-4 | n-3 | n-2 | n-1 | n |
|---|---|---|---|---|---|---|---|---|---|---|---|---|---|---|
| Temperature | - | - | 33 | 33 | 33 | 34 | 33 | 32 | 33 | 33 | 33 | 33 | 33 | 33 |
| Region | - | - | 2 | 2 | 2 | 2 | 2 | 2 | 2 | 2 | 2 | 2 | 2 | 2 |

Last few samples continuous samples in same region – results in low warning alarm

| Idx No | - | - | - | - | n-9 | n-8 | n-7 | n-6 | n-5 | n-4 | n-3 | n-2 | n-1 | n |
|---|---|---|---|---|---|---|---|---|---|---|---|---|---|---|
| Temperature | - | - | 35 | 33 | 33 | 34 | 35 | 37 | 36 | 33 | 33 | 33 | 33 | 33 |
| Region | - | - | 3 | 2 | 2 | 2 | 3 | 3 | 3 | 2 | 2 | 2 | 2 | 2 |

Last few continuous samples in different regions – results in no change in alarm

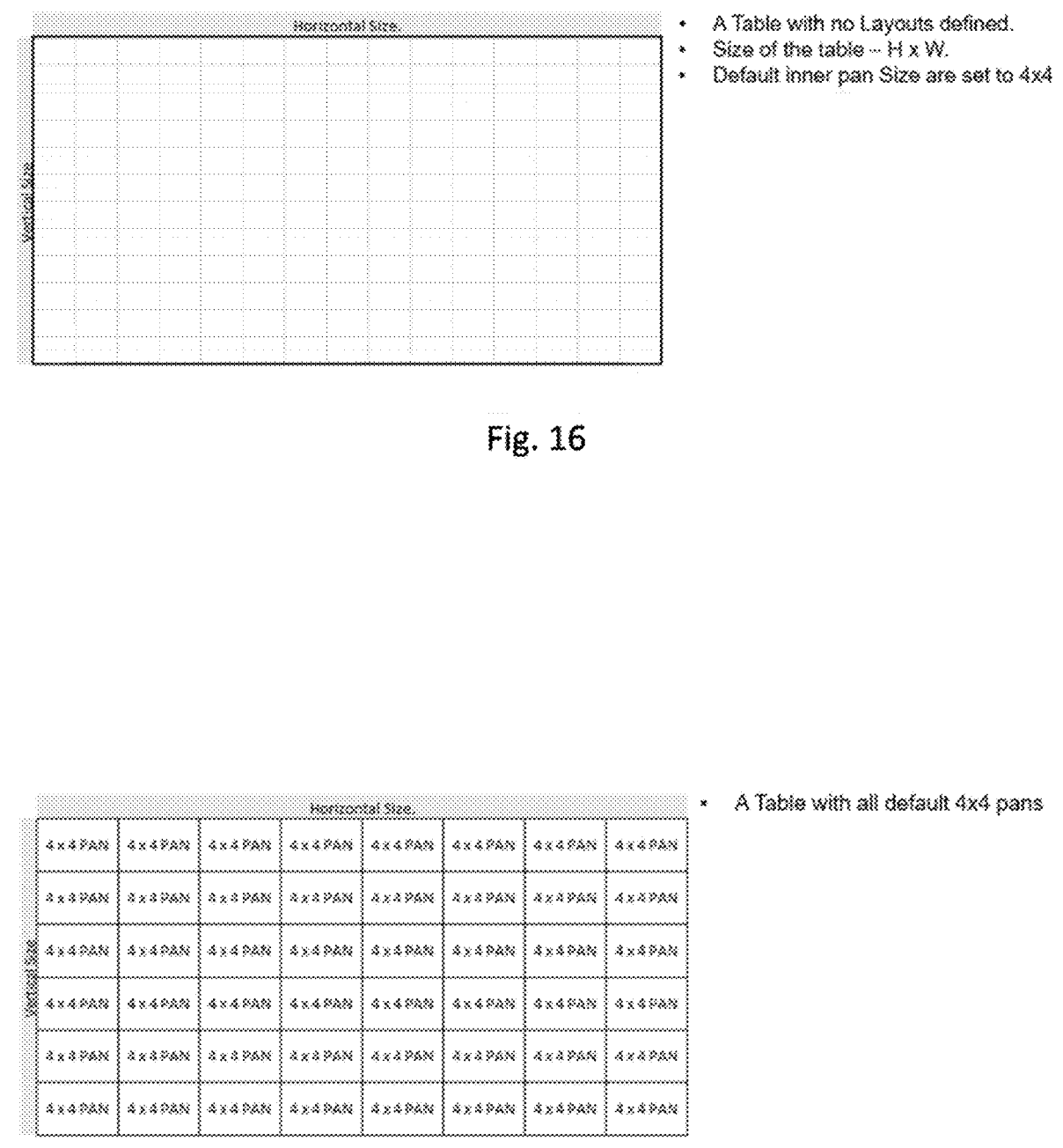

- A Table with no Layouts defined.
- Size of the table – H x W.
- Default inner pan Size are set to 4x4

Fig. 16

- A Table with all default 4x4 pans

Fig. 17

- A Table with custom 8x8, 8x16 and 4x4s
- Some unused area

Fig. 18 a. Illustration of logical probe numbering

Fig. 19

METHOD FOR TEMPERATURE MONITORING AND REGULATION AND SYSTEMS THEREFOR

CROSS-REFERENCE TO RELATED APPLICATIONS

This application is a continuation application of co-pending U.S. patent application Ser. No. 16/716,253, filed Dec. 16, 2019, which is a continuation-in-part application of U.S. patent application Ser. No. 16/111,610, filed Aug. 24, 2018, which claims priority pursuant to 35 U.S.C. 119(e) to U.S. Provisional patent application Ser. Nos. 62/549,769, filed Aug. 24, 2017, 62/629,782, filed Feb. 13, 2018, and 62/646,630, filed Mar. 22, 2018, the entire disclosures of which are incorporated herein by reference.

This application claims priority pursuant to 35 U.S.C. 119(e) to U.S. Provisional Patent application Ser. Nos.
62/779,626, filed Dec. 14, 2018,
62/814,847, filed Mar. 6, 2019,
62/818,084, filed Mar. 13, 2019, and
62/852,848, filed May 24, 2019,
the entire disclosure of which is incorporated herein by reference.

FIELD OF THE INVENTION

The present invention relates generally to temperature monitoring. More specifically, the present invention is concerned with a system for and methods of monitoring food temperature.

BACKGROUND

Maintaining proper food temperatures is critical in the food service and food sales industries. For instance, failure to maintain proper food temperatures can cause food safety issues, can reduce food quality, can increase waste, and/or can lead to failed inspections. Often, food temperatures can be maintained, with a relatively high degree of confidence, simply by storing the food in an area having a relatively constant temperature. For instance, frozen food generally remains frozen when it is stored in a freezer, chilled food generally remains chilled when it is stored in a cooler, and hot food generally remains hot when it is kept in a warmer, such as a crockpot, a warming tray, or the like. Food temperatures are more difficult to maintain, however, when the surrounding environment is maintained at a temperature that is different from the required temperature for the food.

Food prep areas are generally maintained at ambient room temperatures despite the requirement to maintain many of the associated food items at high or low temperatures. While food prep areas are not new, transitioning food prep areas from a back kitchen to the front of the restaurant has become very popular. Such food prep areas allow customers to simply glance through a glass partition at a variety of cheeses, meats, fruits, vegetables, and the like (each a "topping"), thereby providing customers with a variety of choices. This model has become so prevalent and competitive that customers have begun to expect large numbers of choices. These same customers also want to be able to easily see each topping and further continue to expect fast service. Consequently, the toppings are rarely covered (often toppings have no lids while other times lids are left off of toppings for long periods of time for convenience and/or by mistake), leaving them exposed to ambient temperature air for long periods of time, increasing the chances that the temperature of one or more topping will become unsafe. The higher the ambient temperature, the greater the risk.

As a quantity of food items within a bin is depleted, operators will either refill or replace the bin. In either case, food products that have been exposed to ambient air for some time are typically mixed with new food products, thereby increasing the amount of time before the original food is served and decreasing the amount of time the new food will become unsafe. In some circumstances, the new bin is stored in a chiller or a warmer, as the case may be, prior to being moved to the food prep area. In some such circumstances, the food within the bin has already warmed (or chilled as the case may be) due to a malfunction in one or more system, due to a lid being left off for too long, due to an operator simply mishandling the food item (such as leaving the food item out for too long prior to moving it to a cooler, to a warmer, and/or to the food prep area), and/or for a number of other reasons. In some such circumstances, the food item is at a much higher risk of reaching an unsafe and/or undesirable temperature prior to being served and/or may reach an unsafe and/or undesirable temperature prior to even being moved to a food prep area.

Although the growing popularity of "front-of-store" food prep areas and the growing number of topping choices provided by restaurants has exacerbated an existing problem with food prep areas, traditional food storage and food display methods have their own risks. For instance, seafood and butcher shops often store food in cooled display cases. As long as the food remains in the case, the temperature of the food is relatively predictable. Even if the temperature of the cooler is somewhat elevated, a simple calculation can be utilized to predict when food within the cooler will reach an unsafe and/or undesirable temperature. Unfortunately, customers who remove items from such cases often return them, such as if they later change their minds for any of a number of reasons. Consequently, frozen crab legs, a package of steaks, or any number of other food items may be outside of the display cooler for several minutes or even hours before they are returned by a customer or an employee.

The safest way to ensure that toppings and other food items remain at a safe temperature is to monitor the temperature of each food item. Traditional methods of monitoring temperatures include manually probing the food to check the temperature of the food. Such processes can result in cross-contamination of food. Consequently, it would be beneficial to have a system for monitoring temperatures that utilized temperature sensors that did not risk cross-contamination.

Traditional methods of monitoring temperatures are labor intensive and time consuming. Furthermore, traditional methods rely on the diligence of an operator to measure the temperature, the judgment of the operator to make the correct decision based on the measurement, and the confidence of the operator to take appropriate action when necessary. If the operator is not properly trained or is somehow distracted, food may be allowed to reach an unsafe temperature, requiring such food to be discarded. In even worse situations, food that should be discarded may be served to customers instead. Consequently, it would be beneficial to have an automated system for monitoring temperature of food items and/or a system for continuously or in real time monitory temperature of food items. Furthermore, it would be beneficial to have an automated system that is capable of providing a warning or alert to a user if a food item is approaching or has reached an unsafe temperature. Furthermore still, it would be beneficial to have an automated system that is capable of taking action to stabilize and/or improve food temperature and/or to ensure that unsafe food is discarded or otherwise prevent a user from serving food at an unsafe temperature.

Additionally, ensuring consistency in food preparation is vital in maintaining a high level of quality control and inventory management within the food industry. For instance, a consumer visiting a restaurant and ordering a particular food item expects that food item to be the same from visit to visit and the same at varying locations of the restaurant the customer visits. Oftentimes, inconsistencies with food preparation can lead to lower customer satisfaction and lower the revisiting patronage of single location restaurants and large chain restaurants alike. Additionally, inconsistent preparation of food items greatly impacts the predictability of inventory flow. For restaurants serving hundreds or thousands of orders daily, small variances can lead to lost profits due to lost sales from lack of stocked product or from having to throw out product which goes unused due to over-stocking.

Generally, restaurants maintain a standard recipe and weight guidelines for preparation of all food items. However, merely providing such a standard recipe to employees does not ensure precision and accuracy of adhering to the recipe. A worker may miss a step in the recipe or erroneously employ too much or too little of an ingredient in food preparation. One would expect the employee to become more practiced in preparation of a food item over time. However, oftentimes restaurants are continuously changing the product offerings. These changes oftentimes facilitate a change in the layout of a restaurant's ingredients, which subsequently requires an employee to learn not only a new recipe, but also learn the new layout of ingredients for preparation of familiar recipes. Due to the fluid nature of the restaurant's offerings, consistent food item preparation is difficult to achieve.

Accordingly, it would be beneficial to have a system which assisted users in identifying ingredients in a recipe and identified the necessary amount of ingredient to use. Such a system would ensure proper preparation of food items and consistency across locations. Such a system would also minimize the learning curve for new employees and for new restaurant offerings. Moreover, it would be beneficial to have a system which stored recipes and correctly illuminated ingredients to lead a worker through the preparation of a food item. It would be beneficial as well for such a system to be slim and streamlined, with a minimization of moving parts and easily replaceable accessories with redundancies built in to minimize downtime.

SUMMARY

The present invention comprises a monitoring system in data communication with one or more means of obtaining temperature information, such as a thermal imaging camera, one or more temperature sensor(s), or the like (each a "temperature sensing device"). The monitoring system interprets temperature data received from the temperature sensing device(s) to determine whether one or more item, such as a food item (or an area/bin/container in which one or more item is located), is (or likely is) outside of a preferred temperature range and/or an allowed temperature range. If an item is (or likely is) outside of a preferred temperature range but still within an allowed temperature range for a determined or specified period of time (or in some embodiments, simply upon crossing the threshold temperature), the monitoring system causes a warning to be provided to a user and/or causes one or more action to occur in an effort to stabilize and/or improve the temperature of the item. If the item is (or likely is) outside of the allowed temperature range for a determined or specified time period (or in some embodiments, simply upon crossing the threshold temperature), a control system of the present invention causes an alert to be provided to a user and/or causes one or more action to occur in an effort to ensure that the item is discarded and/or to otherwise prevent the item from being used and/or served.

Some embodiments of the present invention use one or more touchless temperature sensing device, such as an infrared temperature sensor or any other touchless temperature sensing device now known or later developed. In this way, the temperature of numerous items can be detected without risking cross-contamination of the items. In some embodiments, one or more dedicated temperature sensing device is utilized to minimize cross contamination of food or other items. Some embodiments of the present invention include temperature sensors molded into pans, bins, or the like, temperature sensors printed onto or otherwise coupled to pans, bins, or the like, and/or any other temperature sensor that is configured to obtain temperature information associated with one or more pan, bin, item, product, or the like. In some embodiments, each temperature sensing device is configured, positioned, and oriented so as not to interfere with movement of the one or more sensed item and/or one or more item associated with the same, or not to otherwise interfere with or impede the ability to manipulate, serve, stir, load/unload, visually identify, etc., the items. In some embodiments, the system is a food prep table system and each temperature sensing device is positioned and oriented so as to not obstruct preparation of food. In some embodiments, the monitoring system includes a recording protocol for recording data received by the one or more temperature sensing device. In some such embodiments, the monitoring system further includes a control protocol for opening or closing a hood, lid, or the like, for directing a temperature sensing device to take a reading, to cause a temperature system to be repositioned, reconfigured, and/or reoriented (such as for taking a temperature reading of a desired item and/or a desired location on an item), or the like.

In some embodiments, the temperature sensor is incorporated into one or more bin, lid, or other item, such as a stirring device, a serving device, or the like. In some such embodiments, the temperature sensor is a temperature probe requiring contact with and/or close proximity to the item being measured. In some embodiments, a temperature probe or other contact temperature sensor is utilized in combination with other temperature sensor(s) or imaging devices of the inventive concept. In some such embodiments, one or more temperature probes (or other contact sensors) are used periodically, and manually, to inspect the central temperature of food items ("central probing") as required for compliance with food safety inspection procedures, such as required in Hazard Analysis Critical Control Point (HACCP) plans. Such central probing is utilized in combination with the continuous/real-time monitoring and/or control system of the inventive concept. In some such embodiments, the central probing temperature sensor is a separate sensor to the one or more sensors or thermal imaging devices that are utilized to continuously monitor and/or control the temperature of items maintained within the system. In other embodiments, the central probing temperature sensor is utilized both for the manual/periodic central probing and also for use in the continuous/real-time monitoring. In that manner, the system of the inventive concept allows an easy mechanism for compliance with food safety requirements, while at the same time monitoring and/or control temperature to help ensure food items stay in compliance with food safety requirements. In some embodiments, the system of the inventive concept records/logs central probing temperature readings, time, date, type of item, location, etc., as well as similar data regarding the continuous monitoring and control activities.

In some embodiments, the system includes one or more sensor other than a temperature sensor, such as a light sensor, a color sensor, a gas sensor, or any other sensor now known or later developed. In some embodiments, one or more sensor is utilized for monitoring or determining one or more quality of an item, such as a food item. In some embodiments, a monitored (or determined) quality is a freshness of a food item, decay of a food item, aging of a food item, or the like. In some embodiments, a quality of an item, such as a food item, is associated with one or more freshness indication, aging parameter, or the like.

In some embodiments, the invention includes one or more system for and/or method of communicating information, such as to a local and/or remote system and/or device. In some embodiments, the invention includes one or more system for and/or method of monitoring and/or controlling a prep table from one or more remote location. In some embodiments, the invention includes one or more system for and/or method of monitoring and/or controlling a plurality of prep tables from a single remote location, regardless of the location of each prep table. In some embodiments, the system includes a system for and/or method of communicating information via a wireless and/or wireless connection or otherwise.

In some embodiments, the invention includes one or more system for and/or method of assisting a user in preparation of a food item. In some embodiments, the invention includes one or more system for and/or method of illuminating ingredients in bins according to a recipe. In some embodiments, the invention includes a system and/or method for automatically identifying the layout of bins within a pan. In some embodiments, the system and/or method includes identifying the ingredients contained within bins.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

FIG. 16 is a top plan view of a preparation table layout according to some embodiments of the present invention.

FIG. 17 is a top plan view of the preparation table layout of FIG. 16 with default pan sizes, according to some embodiments of the present invention.

FIG. 18 is a top plan view of the preparation table layout of FIG. 16 with custom pan sizes, according to some embodiments of the present invention.

FIG. 19 is a top plan view of probe numbering according to some embodiments of the present invention.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
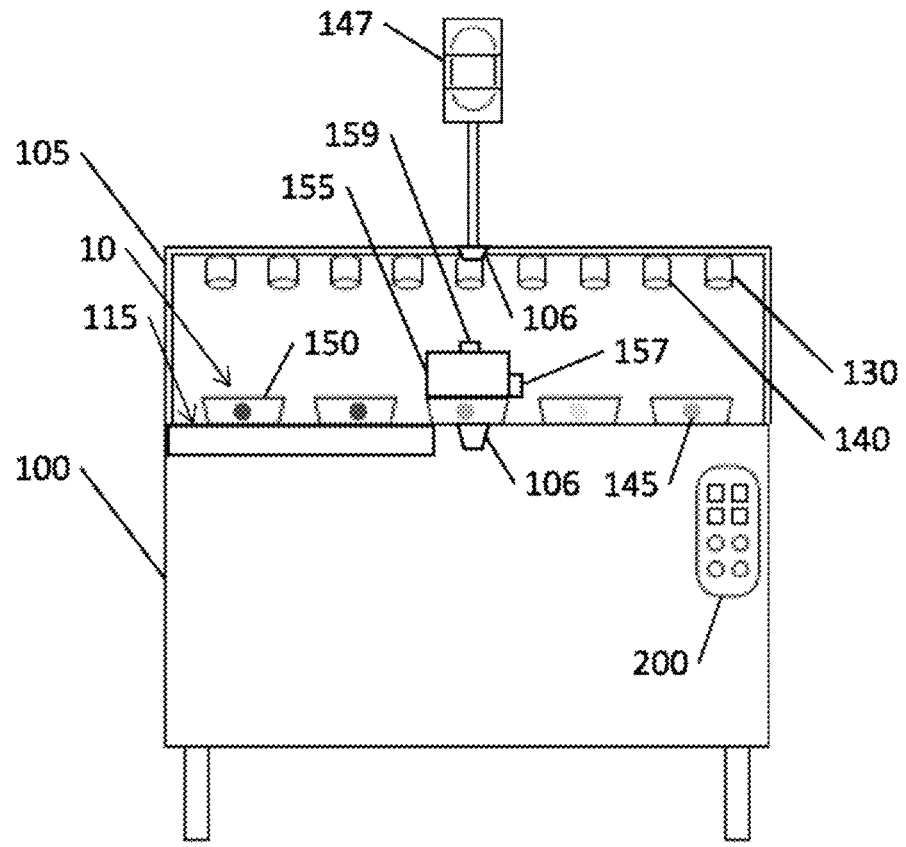
FIG. 1 is a front elevation view of a system of the present invention.
Figure 2:
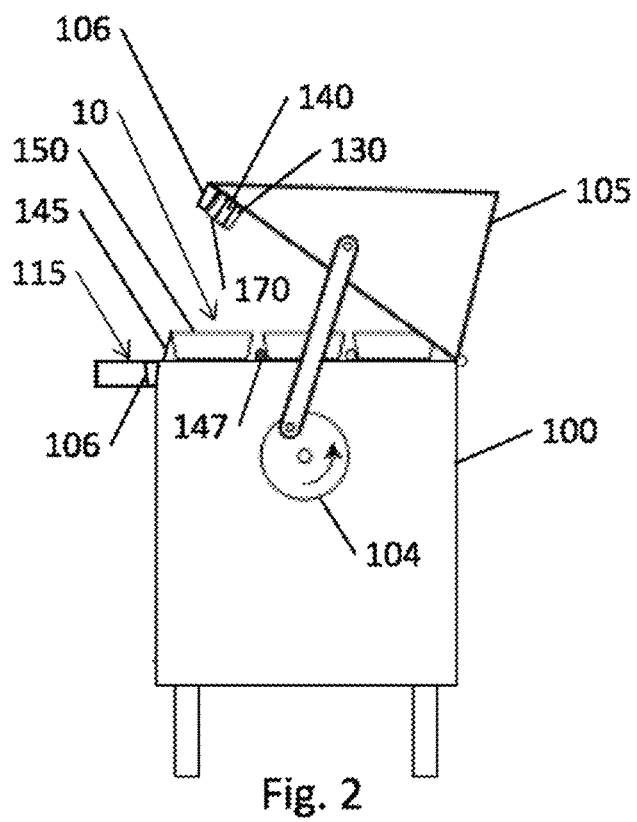
FIG. 2 is a side elevation view of a system of the present invention.
Figure 3A:
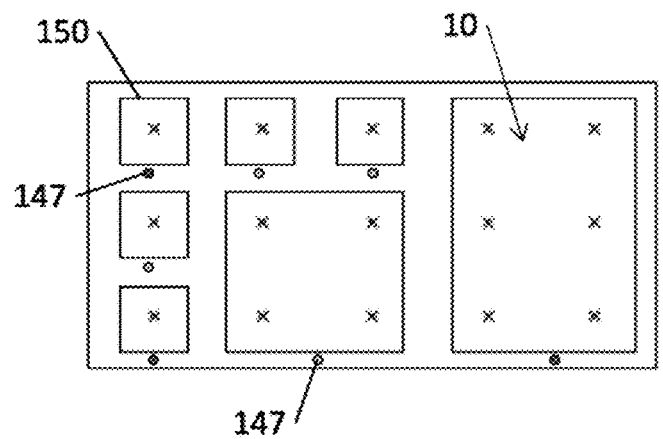
FIG. 3A is a schematic depicting sensor read locations and sensor groupings.
Figure 3B:
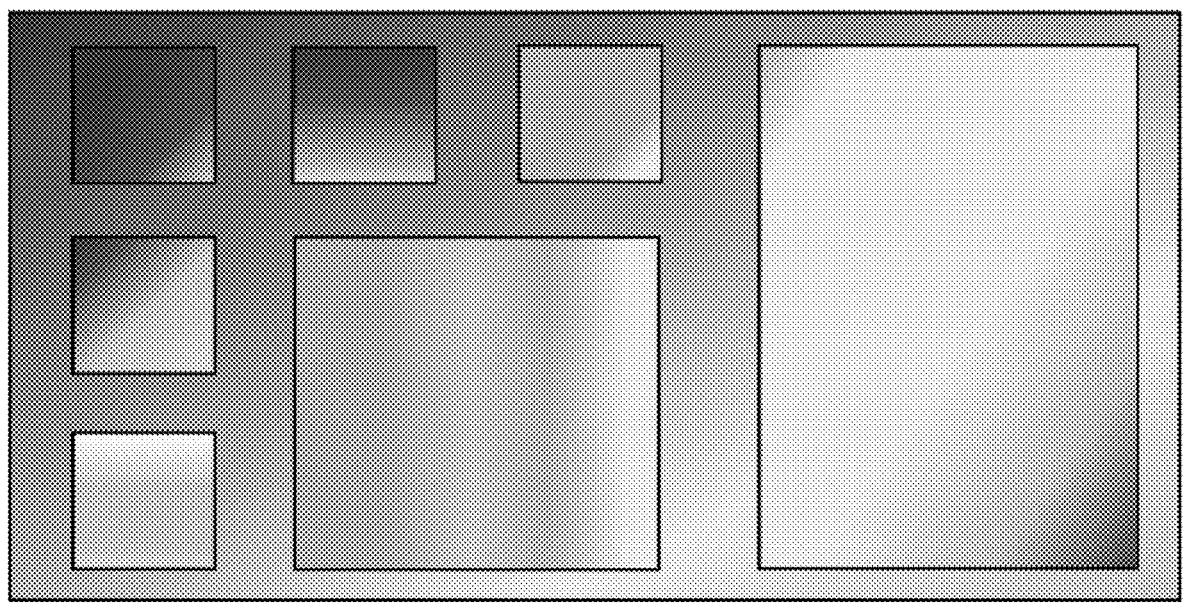
FIG. 3B is a schematic depicting a thermal imaging map associated with certain embodiments of the present invention.

Referring to FIG. 1, some embodiments of the present invention include a base 100 defining an interior area for holding one or more item, substance, or the like (each being a "topping" 10), such as one or more food item or the like. In some embodiments, the interior area of the base 100 is defined by a plurality of side walls extending vertically from a bottom panel. In some embodiments, the base 100 defines a top opening for viewing and/or accessing one or more topping 10. In some such embodiments, the base 100 defines a generally open top. In some embodiments, the base includes one or more rail and/or supports one or more rail. In some embodiments, the base includes and/or supports one or more raised rail, recessed rail, or the like. In some embodiments, one or more rail defines a first opening with divider bars configured for receiving one or more pan, bin, or the like. In some embodiments, one or more rail is in thermal communication with one or more thermal system. In some embodiments, one or more rail is divided into separate compartments. In some embodiments, one or more rail defines a single compartment.

In some embodiments, the present invention utilizes one or more container, such as a tray, a tub, a bucket, a bin, or the like (each a "bin" 150). Each bin 150 defines an interior area for holding one or more topping 10. In some embodiments, the interior area of each bin 150 is defined by a plurality of side walls extending vertically from a bottom panel. In some embodiments, each bin 150 defines a top opening for viewing and/or accessing one or more respective topping 10. In some embodiments, the base 100 is configured to hold a plurality of bins 150 such that a top opening of each bin 150 is positioned adjacent to and/or is accessible through the top opening of the base 100. In some embodiments, at least some bins are configured to extend through the top opening of the base 100.

In some embodiments, the base 100 includes a base lid 105 that is moveable between an open configuration and a closed configuration. When the base lid 105 is in the open configuration, toppings within the base 100 are visible and accessible, such as through a top opening of the base 100. When the base lid 105 is in the closed configuration, toppings within the base 100 are inaccessible. In some embodiments, the base lid 105 is formed at least partially from a transparent material, such as glass or plastic, such that toppings within the base 100 are visible regardless of whether the base lid 105 is in the open or closed configuration.

In some embodiments, the base 100 includes a drive system 104 mechanically coupled to the base lid 105 such that the drive system 104 is capable of moving the base lid 105 between its open and closed configurations. In some embodiments, the base 100 includes a locking system 106 for securing the base lid 105 in its closed configuration and/or for otherwise inhibiting the base lid 105 from moving away from its closed configuration. In some embodiments, the system of the present invention includes a control system for controlling a configuration of the base lid 105, such as by controlling the drive system 104 and/or the locking system 106 of the base 100.

In some embodiments the base 100 is a heated base, a chilled base, or the like. In some embodiments, the control system is configured to control the configuration of the base lid 105 so as to control a temperature inside the base 100 and/or to control a temperature of a topping 10 associated with the base 100. In some embodiments, the control system is configured to control the configuration of the base lid 105 so as to inhibit or allow access to one or more bin 150 and/or topping 10 associated with the base 100. In some embodiments, the system is configured to monitor the status of the lid, such as by recording one or more duration of time the lid remains in an open and/or closed configuration. In some embodiments, the system is configured to open or close the lid based on one or more factor, such as duration of time the lid has been open or closed. In some embodiments, the system is configured to generate one or more notice and/or alert associated with one or more recorded duration of time meeting, exceeding, or falling below one or more threshold range and/or value for the same. In some embodiments, notices and/or alerts are triggered based on a combination of factors, including durations of time the lid remains in one or more configuration, temperatures associated with one or more product or environment, quantity of one or more product, quality of one or more product, or the like.

In some embodiments, one or more bin 150 of the present invention includes a bin lid 155 that is moveable between an open configuration and a closed configuration. When the bin lid 155 is in the open configuration, toppings within the bin 150 are visible and accessible, such as through a top opening of the bin 150. When the bin lid 155 is in the closed configuration, toppings within the bin 150 are inaccessible. In some embodiments, the bin lid is formed at least partially from a transparent material, such as glass or plastic, such that toppings within the bin 150 are visible regardless of whether the bin lid 155 is in the open or closed configuration. In some embodiments, at least a portion of the bin 150 and/or the bin lid 155 is at least partially transparent or at least partially translucent.

In some embodiments, the base 100 and/or one or more bin 150 includes a means of moving the bin lid 155 between its open and closed configurations. In some embodiments, the means of moving the bin lid 155 includes one or more robotic arm, actuator, spring member, or the like (each a "drive system" 157). In some embodiments, the base 100 and/or one or more bin 150 includes means of securing one or more bin lid 155 in a respective open or closed configuration and/or for otherwise inhibiting one or more bin lid 155 from moving away from a respective closed or open configuration (each a "locking system" 159). In some embodiments, the control system of the present invention is configured to control a configuration of one or more bin lid 155, such as by controlling the drive system 157 and/or the locking system 159.

In some embodiments one or more bin 150 is a heated bin, a chilled bin, or the like. In some embodiments, a first bin associated with a first base is a heated bin and a second bin associated with the first base is a chilled bin. In some such embodiments, the base is a heated base. In other such embodiments, the base is a chilled base. In still other such embodiments, the base is neither heated nor chilled. In some embodiments, a third bin associated with the first base is neither heated nor chilled. In some embodiments, the first bin is one of a heated bin and a chilled bin and the second bin is neither heated nor chilled. In some embodiments, the control system is configured to control the configuration of one or more bin lid 155 so as to control or otherwise influence a temperature inside the respective bin 150 and/or to control or otherwise influence a temperature of a topping 10 associated with the respective bin 150. In some embodiments, the control system is configured to control the configuration of one or more bin lid 155 so as to inhibit or allow access to one or more topping 10 associated with the same.

Some embodiments of the present invention include a rail system for supporting one or more bin 150 and/or item 10. In some embodiments, the rail system defines a channel for holding one or more fluid for transferring to and/or away from one or more bin 150 and/or topping 10, thereby providing temperature control for the same or otherwise influencing temperature of the same. In some embodiments, one or more surface of the rail system is a chilled surface and/or a heated surface. In some embodiments, rail system is configured so as to cause or otherwise allow fluid to circulate through the channel, to otherwise allow fluid to flow past one or more bin 150, and/or to otherwise influence heat transfer to and/or from one or more bin 150, thereby assisting in the maintenance and/or adjustment of temperatures associated with the same.

Some embodiments of the present invention include a prep surface 115. In some embodiments, the prep surface 115 extends from the base 100 or is otherwise positioned in close proximity to the base 100. In some embodiments, the prep surface 115 is positioned on a back side of the base so as to provide a work surface for preparing sandwiches, burritos, salads, and the like. In some embodiments, the prep surface 115 includes a temperature-controlled area, such as a chilled area and/or a heated area. In some embodiments, the prep surface 115 includes a first heated area, a second chilled area, and/or a third area that is neither heated nor chilled.

In some embodiments, the present invention includes one or more temperature control system, such as a heating system and/or a cooling system. In some embodiments, the temperature control system includes one or more tube or other structure for circulating a thermal fluid, thereby enabling the transfer of thermal energy to and/or away from one or more surface, structure, or item, or the like. In some embodiments, the temperature control system is configured to draw heat energy away from one or more topping 10 and/or bin 150 by cooling the thermal fluid prior to circulating the same. In some embodiments, the temperature control system is configured to add heat energy to one or more topping 10 and/or bin 150 by heating the thermal fluid and/or by otherwise transferring heat energy to one or more bin 150 and/or topping 10. In some embodiments, the temperature control system is configured to cool one or more topping 10 and/or bin 150 by cooling the thermal fluid and/or by otherwise transferring heat energy away from one or more bin 150 and/or topping 10. In some embodiments, the temperature control system is configured to maintain a temperature of one or more topping 10 and/or bin 150 by cooling and/or heating the thermal fluid, as required, and/or by otherwise transferring heat energy to and/or away from one or more bin 150 and/or topping 10.

In some embodiments, the base 100 includes a sneeze guard and/or one or more other feature (each a "sneeze guard") for protecting toppings 10 from inadvertent exposure to contaminants or the like and/or to prevent or otherwise hinder air from flowing into or past one or more bin 150, topping 10, surface, or the like. In some embodiments, the sneeze guard protects the interior area of the base 100 and/or one or more area of the prep surface 115. In some embodiments, the sneeze guard is supported by a support structure extending from and/or positioned adjacent to one or more base 100 of the present invention. In some embodiments, the support structure includes a plurality of vertical stanchions for supporting a plurality of support beams, panels, and/or other structures vertically displaced from a top opening of the one or more relative base 100.

In some embodiments, the sneeze guard is at least partially transparent so as to enable a customer or other individual to view toppings through the sneeze guard. In some embodiments, the sneeze guard and/or the support structure includes at least part of a base lid 105 and/or is configured so as to allow at least part of a base lid 105 to move between its closed and opened position.

The system of the present invention further includes one or more temperature sensor 130 for sensing temperature of one or more topping 10. In some embodiments, a plurality of temperature sensors 130 are positioned relative to a plurality of respective toppings 10, each sensor 130 being displaced from a respective topping 10. In some embodiments, each sensor 130 is an infrared sensor or some other type of sensor now known or later developed that is capable of sensing a temperature value without requiring physical contact with such topping. In some embodiments, one or more temperature sensor 130 is secured to the base 100, the base lid 105, a support structure, a sneeze guard, a bin lid 155, or the like.

In some embodiments, the present invention includes a first set of sensors for sensing a temperature value associated with one or more topping 10, such as a temperature of at least a portion of the topping 10, a temperature value associated with a respective bin 150, and/or a temperature value associated with a respective base 100. In some embodiments, the system is configured to obtain one or more temperature value associated with ambient air inside and/or outside a base 100, fluid temperature associated with one or more cooling system associated with the base 100, temperature associated with one or more surface of the base 100 and/or one or more bin 150 associated with the base 100, and/or a temperature associated with one or more other structure or fluid, such as a prep surface, a sneeze guard, a cleaning fluid, or the like.

In some embodiments, each sensor is directed to a predetermined area, such as in the direction of a bin 150, a prep surface 115, or the like. In some embodiments, one or more temperature associated with a condenser coil, a base, a rail, and/or fluid (such as air and/or water) associated with any of the same. In some embodiments, a control system of the present invention is utilized to position and/or align one or more temperature sensor. In some embodiments, a control system is configured to assist positioning and/or alignment of one or more sensor 130 by one or more inspector, manager, worker, maintenance personnel, or the like. In some embodiments, the system is configured to obtain real-time temperature information from one or more sensor and provide such information to at least one of a user of the system, an inspector or other quality-control personnel associated with the system, a manager or other supervisor associated with the user of the system, a customer of items associated with the system, or the like. In some embodiments, the system includes one or more processor for receiving, comparing, storing, deriving, or otherwise processing the information and one or more database for storing threshold values, current and historical temperature values, desired temperature values, algorithms for predicting future temperature values, or the like.

In some embodiments, the system includes a means for displaying information, such as a display panel or the like (a "display panel" 200). In some embodiments, the display panel 200 is attached to the base 100 and/or is otherwise positioned in close proximity to the base 100 so as to provide information to a worker, a customer, maintenance personnel, or the like. Referring to FIGS. 4-9, some embodiments of the display panel 200 are configured to display a plurality of screens for providing a variety of information.

Figure 4:
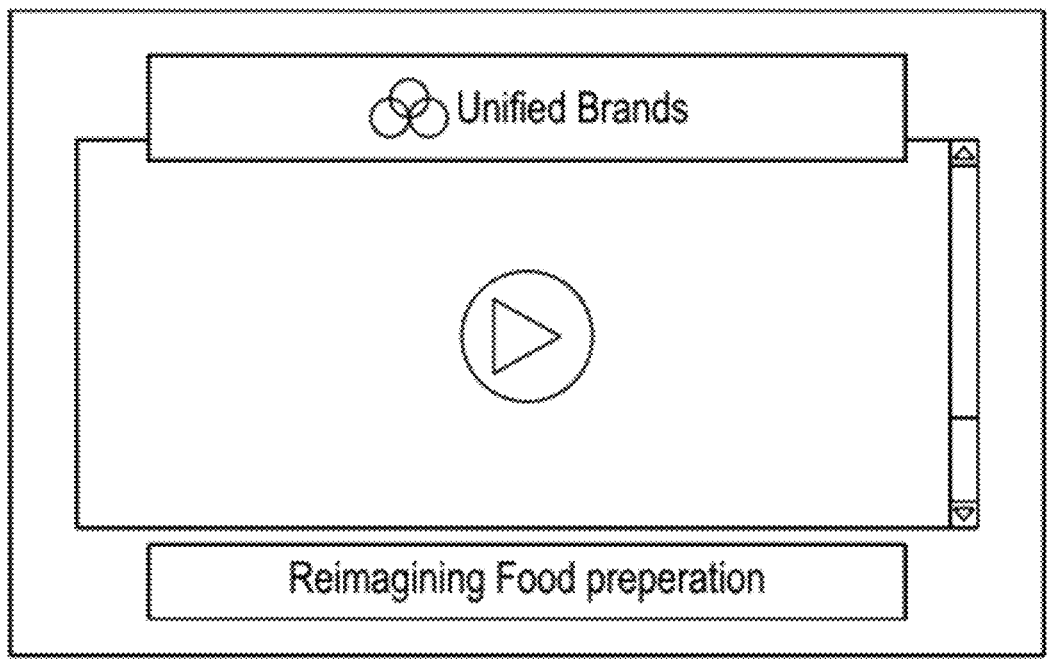
FIG. 4 is a graphic user interface display showing an opening screen associated with the system of the present invention.

Referring to FIG. 4, some embodiments of the present invention are configured to display a first screen, such as an opening screen. In some embodiments, the opening screen is configured to display trademark information associated with a producer of the base, a developer of associated software, a training company, a restaurant using the base, or the like (each being an "associated company"). In some embodiments, the opening screen is configured to show a first set of information in the foreground and a second set of information in the background. In some embodiments, the first or second set of information is a scrolling promotional video, such as a video promoting one or more associated company and/or otherwise providing information associated with the same.

Figure 5:
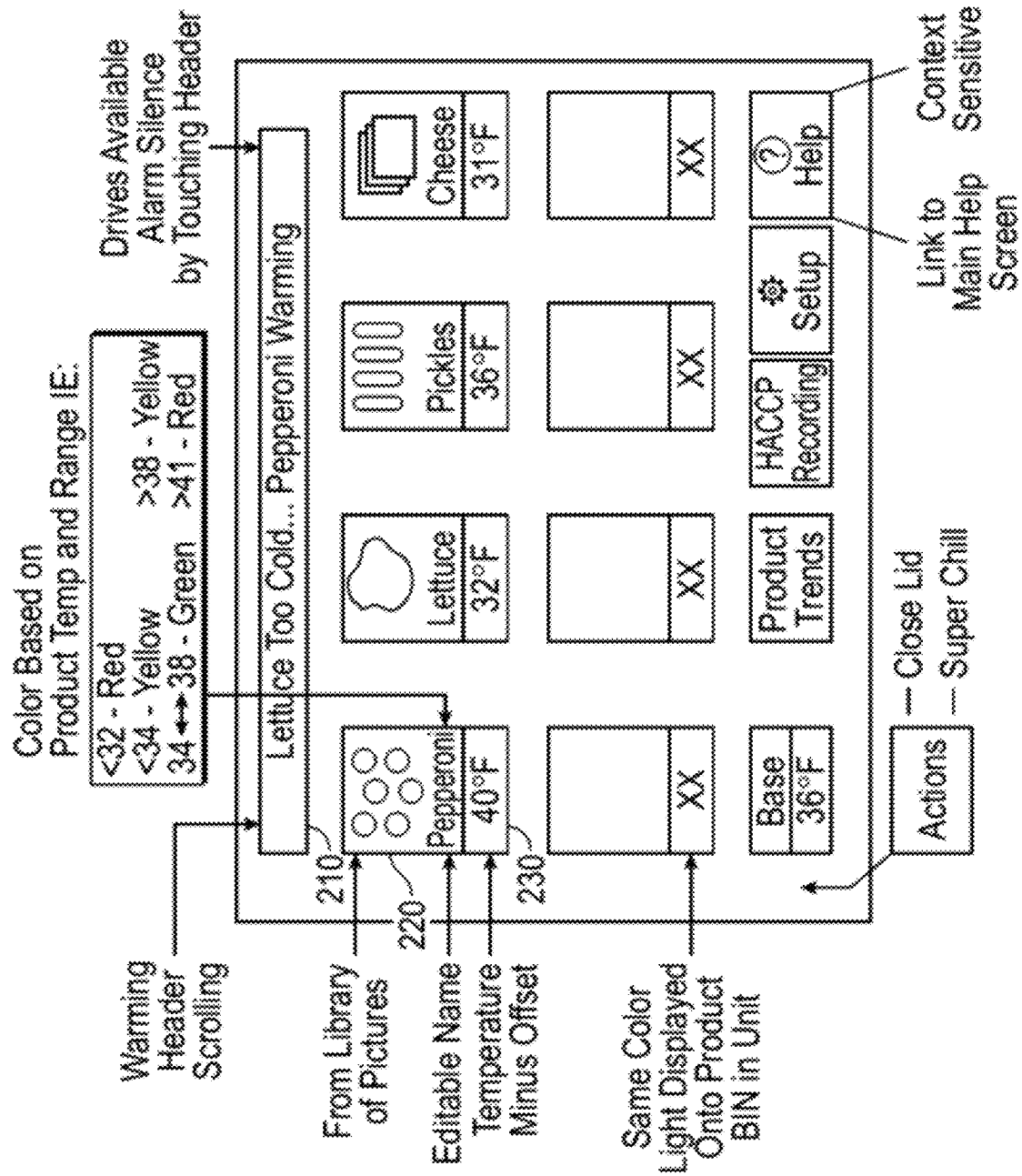
FIG. 5 is a graphic user interface display showing a default screen associated with the system of the present invention.

Referring to FIG. 5, some embodiments of the present invention are configured to display a default screen or the like. In some embodiments, the default screen includes one or more indication associated with one or more topping, system, or surface associated with the base 100. In some embodiments, an indication area is configured as a banner, a large icon, or the like (each being a "banner" 210). In some embodiments, the banner is positioned near a top of the screen or is otherwise conspicuously positioned so as to attract attention. In some embodiments, the banner 210 is configured to display a variety of information, such as an indication of one or more temperature being out of range and/or an indication that one or more heat transfer operation has commenced, will commence, and/or has completed. In some embodiments, information scrolls along the banner 210 and/or such information is otherwise dynamically displayed, such as by periodically replacing a first set of information with sequential second, third, and fourth sets of information prior to replacing a final set of information with the first set of information and/or one or more other set of information. In some embodiments, the system is configured to dwell on a first set of information longer than a second set of information in the event that the first set of information is more critical than a second set of information.

In some embodiments, the banner 210 is associated with an alarm, such as an audible alarm, a flashing light, bold type, colored regions, or the like. In some embodiments, the alarm is triggered by a first event, such as the detection of one or more temperature being out of a first or second range, a topping being contaminated or mislocated, a bin being removed or mislocated, or the like (each an "event" or an "issue"). In some embodiments, a first alarm associated with the banner 210 is a local alarm alerting a worker, a customer, or another individual in the area of a potential issue. In some embodiments, the display device includes a touch screen and at least a portion of the banner 210 serves as a virtual button for enabling user interface with the system of the present invention. In some embodiments, the system includes one or more means of silencing or otherwise addressing the first alarm, such as by touching the banner 210 and/or selecting one or more other feature or function associated with the alarm. In some embodiments, the system distinguishes a first alarm from a second alarm, the first alarm requiring a first action (such as selecting the banner) to silence the alarm and the second alarm requiring a second action (such as closing the lid and initiating a super cooling mode, replacing a topping, input of a manager's code, or the like) for silencing the second alarm. In some embodiments, the first alarm indicates a temperature is about to exceed and/or fall below one or more threshold value (or that the value is outside of a preferred range) while a second alarm indicates a temperature has exceeded and/or has fallen below one or more threshold value, such as when the temperature is outside of a required range.

In some embodiments, the system is configured to execute one or more super-cooling mode. In some embodiments, a super-cooling mode includes energizing one or more fan, diverting additional refrigeration to one or more localized area, or the like. In some embodiments, a super-cooling mode includes temporarily starving a first area of refrigeration (such as a localized area that is not at risk of exceeding a temperature threshold) and redirecting such refrigeration to a second area (such as a localized area that is at risk of exceeding one or more temperature threshold). In some embodiments, the system is configured to execute one or more super-chill mode. In some embodiments, the system is configured to temporarily increasing power to one or more cooling system and/or otherwise temporarily increasing cooling associated with the system during one or more super-chill mode. In some embodiments, the system is configured to separate one or more localized area from ambient air during a super-cooling and/or super-chill mode.

Still referring to FIG. 5, some embodiments of the default screen include a plurality of indication areas, such as a plurality of icons or the like (each an "icon" 220). In some embodiments, each icon 220 includes a visual indicator of a topping 10, surface, system, screen, or the like associated with the icon 220. In some embodiments, the visual indicator is graphic, such as a picture and/or other graphical representation of a food item, a system, or the like. In some embodiments, the visual indicator is an alpha-numeric indicator, such as a name, an abbreviation, or the like. In some embodiments, at least a portion of the icon 220 is editable. In some such embodiments, a graphic portion and/or alpha-numeric portion of the icon is selected and/or selectable from one or more library associated with the system. In some embodiments, one or more portion of the icon 220 is editable.

In some embodiments, at least some icons 220 are associated with a function or action, such as an action for closing or opening a base lid, a bin lid, or the like, initiating, ending, and/or adjusting a heating function, a cooling function, stirring function, or the like, and/or some other function and/or action associated with the present invention (each an "action"). In some embodiments, at least a portion of the icon 220 serves as a virtual button for enabling user interface with the system, thereby enabling the user to elect to initiate, end, and/or adjust one or more action.

Still referring to FIG. 5, some embodiments of the default screen include a plurality of display areas for displaying real-time information and/or one or more threshold information (each being a "temperature display" 230). In some embodiments, each temperature display 230 is configured to display a real-time temperature reading associated with one or more monitored topping 10, bin 150, surface, system, ambient air, or the like. In some embodiments, one or more real-time temperature reading represents a precise monitored temperature value, thereby representing a measured temperature value. In some embodiments, one or more real-time temperature reading is adjusted up or down by an offset number, thereby representing an adjusted temperature value. In some embodiments, the measured temperature value is adjusted to account for one or more uncertainty and/or to otherwise account for anticipated and/or calculated changes in temperature. In some embodiments, the temperature display 230 is configured to provide an indication of whether a temperature value is outside one or more threshold value. In some such embodiments, the temperature display 230 is configured to be green if the measured and/or adjusted temperature is within a preferred temperature range, yellow if the measured and/or adjusted temperature is outside of the preferred temperate range but within a required temperature range, and red if the measured and/or adjusted temperature is outside of the required temperature range. In some embodiments, each temperature display 230 is positioned adjacent to a respective icon 220.

Figure 6:
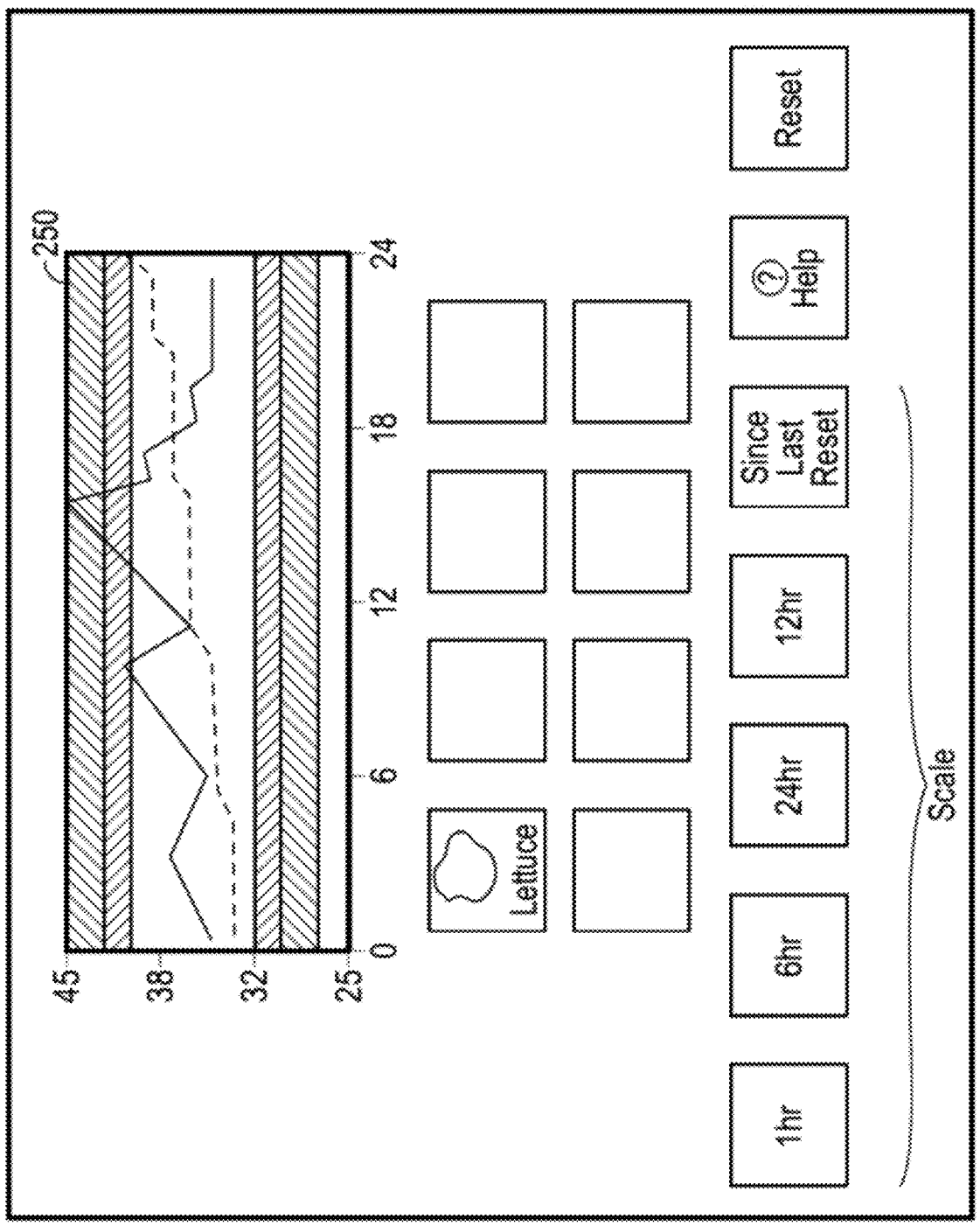
FIG. 6 is a graphic user interface display showing a trend screen associated with the system of the present invention.

Referring to FIG. 6, some embodiments of the present invention are configured to display a product trend screen or the like. In some embodiments, the product trend screen includes a chart 250 for showing measured and/or adjusted temperature values over time for one or more monitored item. In some embodiments, the product trend screen includes a plurality of icons associated with one or more monitored item, one or more time range, one or more action, or the like. In some embodiments, the system is configured to display a chart 250 for a first monitored item upon a user selecting an icon associated with the first item, such as an icon displayed on the product trend screen, the default screen, or elsewhere. In some embodiments, the chart provides an indication of one or more threshold value and/or range, such as one or more line or other feature representing each such threshold value and/or range. In some embodiments, the chart displays a first color, such as green, associated with a first preferred range, a second color, such as yellow, associated with a portion of a required range that is outside of the preferred range, and a third color, such as red, associated with values outside of the required range.

Figure 7:
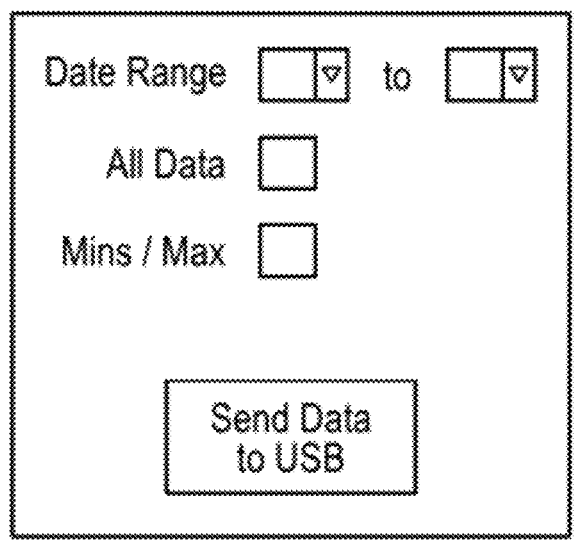
FIG. 7 is a graphic user interface display showing an input screen associated with the system of the present invention.

Referring to FIG. 7, some embodiments of the present invention are configured to display an interface screen for allowing a user to indicate a date range for obtaining and/or exporting stored information. In some embodiments, the system is configured to allow a user to export and/or delete all data associated with one or more date range and/or to export just minimum and maximum values associated with the same.

Figure 8:
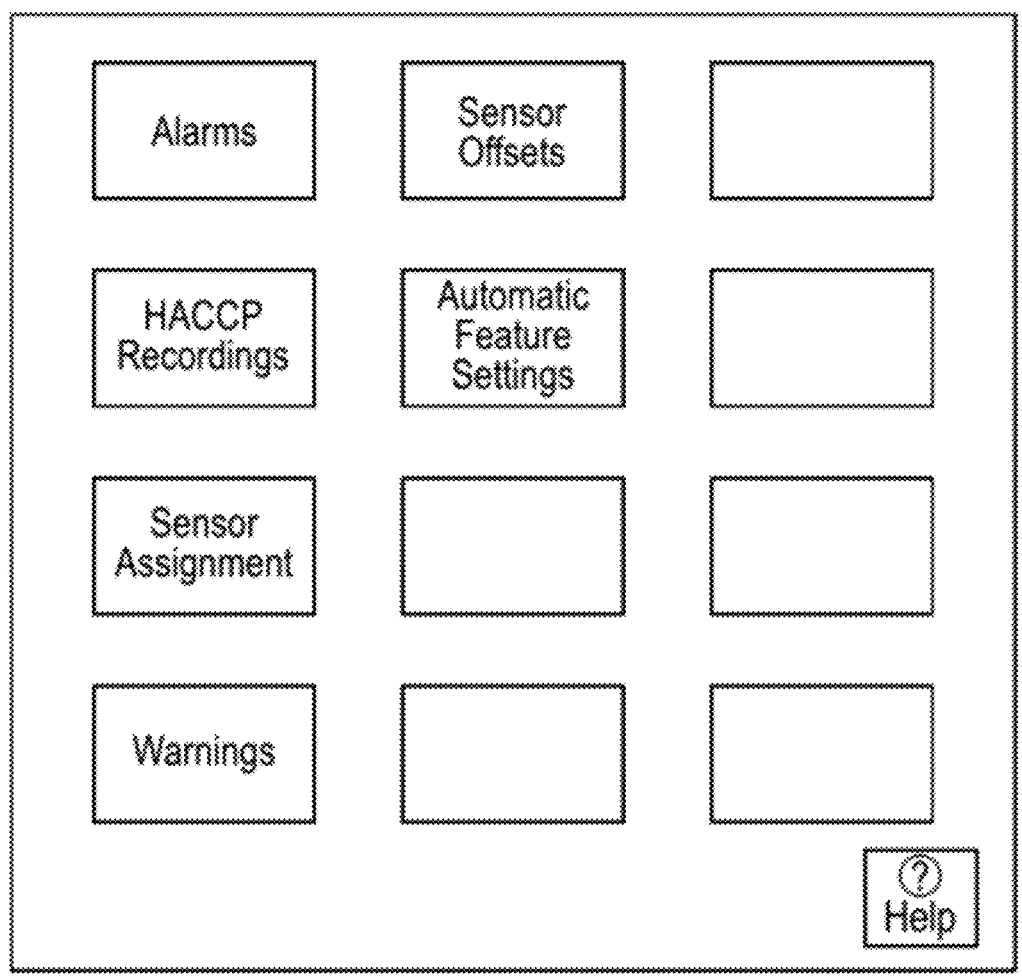
FIG. 8 is a graphic user interface display showing a set-up screen associated with the system of the present invention.

Referring to FIG. 8, some embodiments of the present invention are configured to display a set-up screen. In some embodiments, the set-up screen displays a plurality of icons 220 for allowing a user to create, adjust, delete, initiate, or otherwise manipulate one or more action and/or feature of the present invention. In some such embodiments, one or more icon 220 of the set-up screen is associated with one or more alarm and/or warning, one or more recording and/or other recorded information, one or more sensor assignment, one or more sensor position and/or alignment, one or more feature setting, a help screen, or the like.

Figure 9:
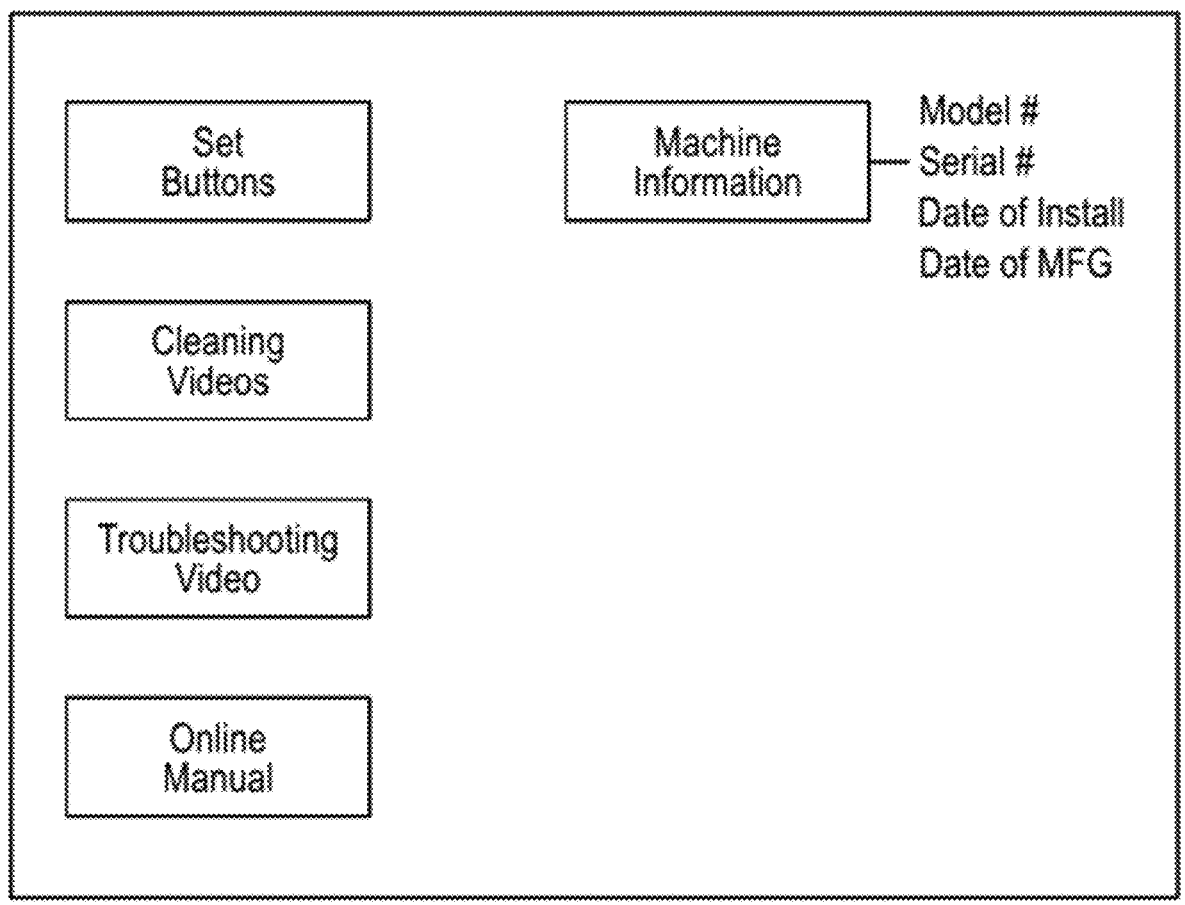
FIG. 9 is a graphic user interface display showing a help screen associated with the system of the present invention.
Figure 10A:
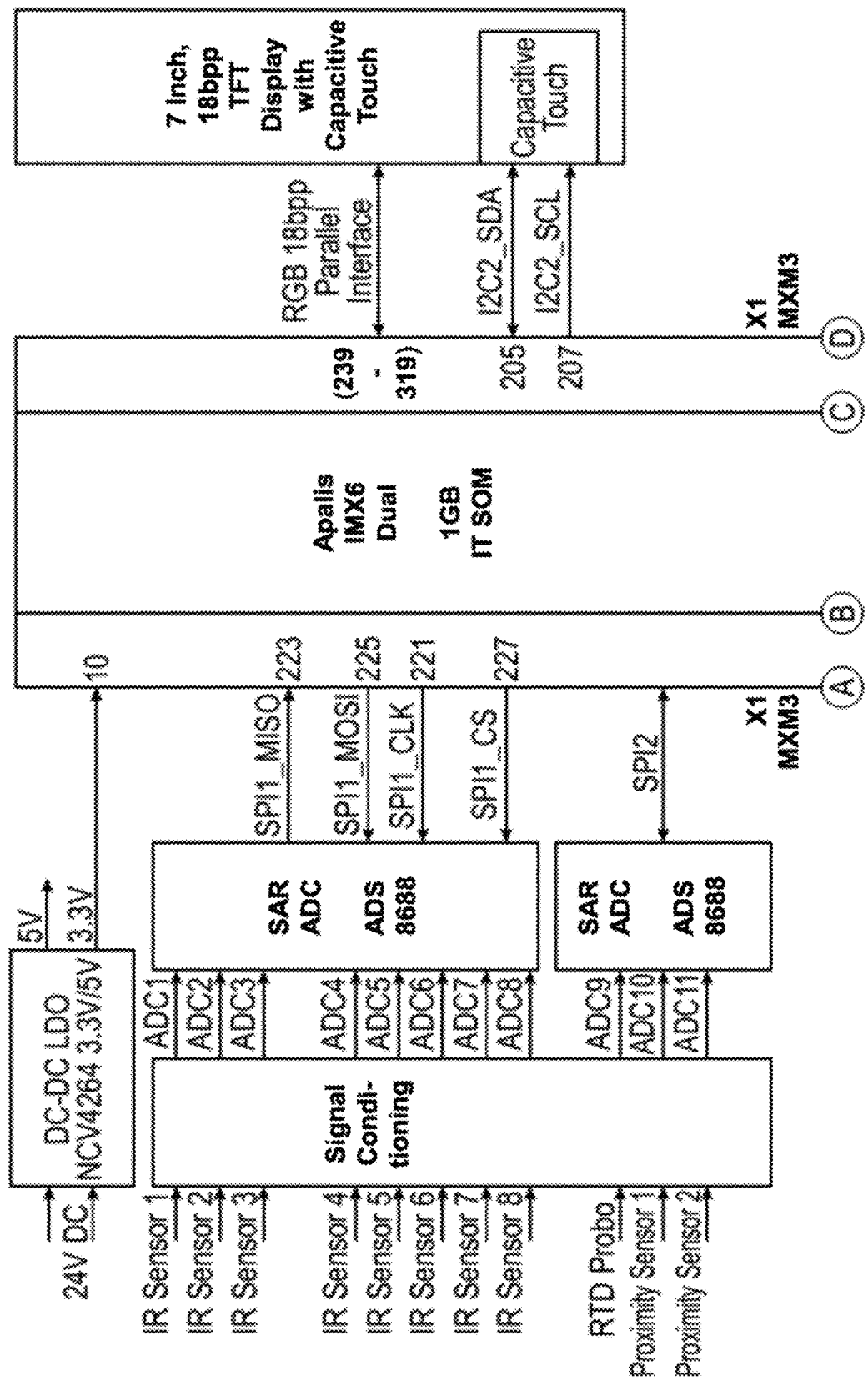
FIG. 10A is a first portion of a block-diagram for an electronic controller module of an embodiment of the present invention.
Figure 10B:
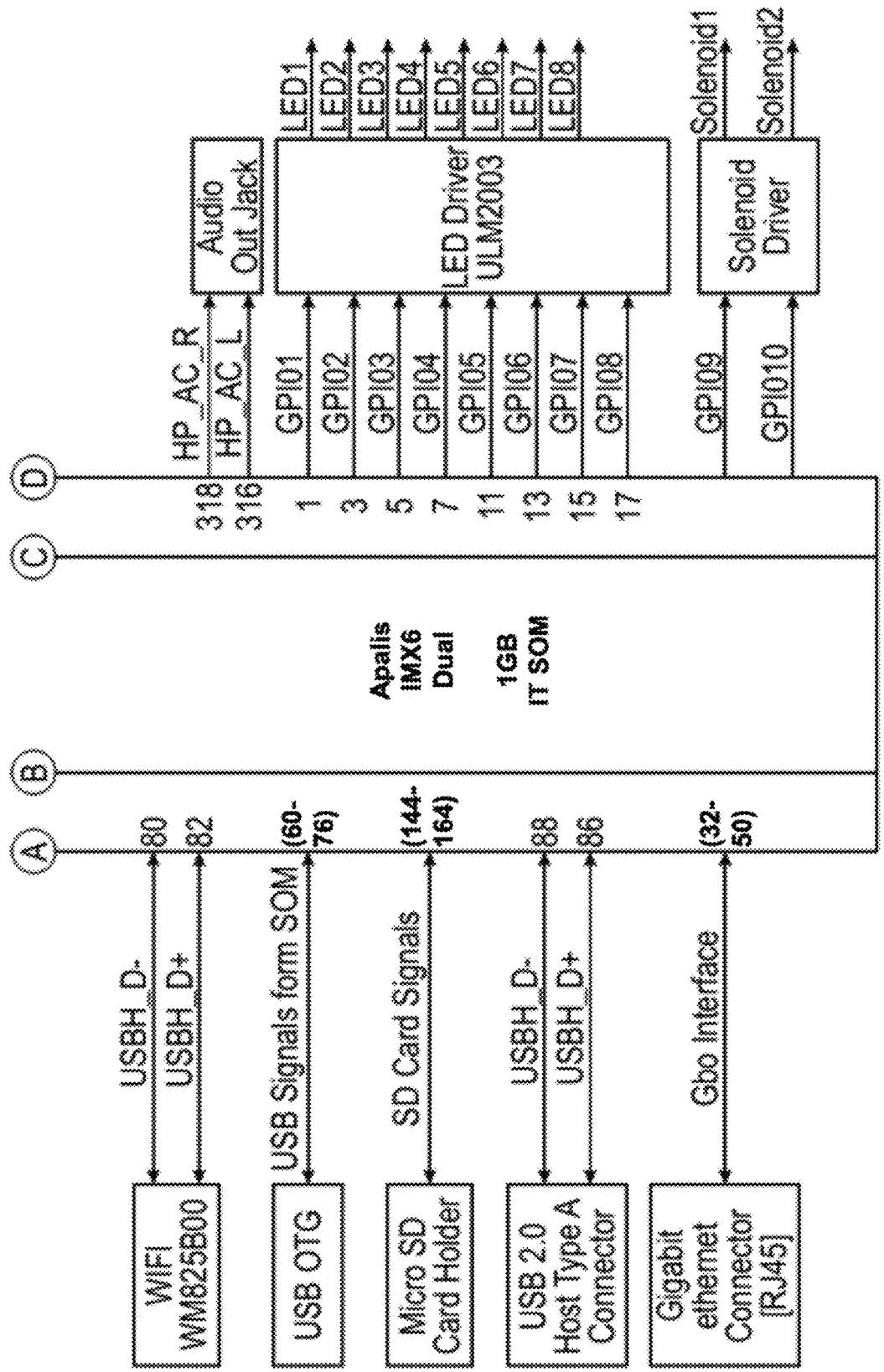
FIG. 10B is a second portion of the bloc-diagram of FIG. 10A.

Referring to FIG. 9, some embodiments of the present invention are configured to display a help screen. In some embodiments, the help screen displays a plurality of icons 220 for allowing a user to search for assistance in operating the system of the present invention and/or for otherwise obtaining information regarding the same. In some embodiments, one or more icon 220 of the help screen is associated with information pertaining to setting buttons, cleaning, troubleshooting, or otherwise maintaining the system, or otherwise obtaining information associated with the machine, including an online manual, model number, serial number, date of installation, date of manufacture, or the like.

In some embodiments, the system is configured to obtain ambient air temperature and one or more system temperature, such as an average temperature of air exiting a condenser or the like. In some embodiments, the system is configured to compare the ambient air temperatures with the one or more system temperature so as to predict potential changes in temperature of one or more monitored item, such as a topping 10. In some embodiments, the system is configured to provide one or more warning, alarm, and/or other indication associated with ambient and/or system temperatures. In some embodiments, the system is configured to perform one or more function, such as closing a base lid 105 of the system in the event that the ambient temperature and/or the one or more system temperature fails to fall within one or more preferred and/or required temperature range.

In some embodiments, the system includes one or more means of providing an indication associated with a temperature and/or a warning or alarm associated with one or more monitored item (herein, an "indication element" 147). In some embodiments, one or more indication element 147 is positioned at or adjacent to a respective bin 150 and/or on a respective bin 150 or otherwise positioned at or adjacent to a topping 10 or other monitored item. In some embodiments, the indication element 147 is located centrally with respect to the system to provide a general warning that the system requires attention. In some such embodiments, in which a centrally located indication element is located (e.g. above a hood), additional indication element(s) are located adjacent to a respective bin 150 and/or on a respective bin 150 or other positioned at or adjacent to a topping 10 or other monitor item, allowing a user to approach the system upon seeing the centrally located indication and determine the specific bin/item that requires attention. In some embodiments, the indication element 147 is a light, such as a multi-color light or the like. In some embodiments, a plurality of light emitting diodes or other indication elements 147 are associated with a single monitored item. In some embodiments, one or more indication element 147 is a multi-mode element, such as a multi-color light-emitting diode. In some embodiments, the system is configured to utilize one or more indication element 147 to provide an indication of one or more measured, predicted, and/or adjusted temperature falling outside of one or more respective preferred, required, or other temperature range. In some embodiments, a first indication associated, such as a single illuminated light and/or an indication associated with a first color (such as a yellow light), is utilized to indicate that a respective temperature value is not within a first range, such as a preferred range. In some embodiments, a second indication, such as multiple illuminated lights and/or an indication associated with a second color (such as a red light), is utilized to indicate that a respective temperature value is not within a second range, such as a required range. In some embodiments, a third indication is utilized to indicate that a temperature value is within the first and/or second range. In some embodiments, the indication is positioned discretely, such as on a back side of a respective bin 150, so as to be conspicuous to a worker while being inconspicuous or even concealed from a customer. In some embodiments, one or more indication is selectively configurable so as to be either conspicuous or inconspicuous to a customer, thereby providing a user of the system and/or a customer associated with the system an ability to establish a preferred indication mode. In some embodiments, one or more alarm or warning system is configured to provide an indication to a customer as well as a worker. In some embodiments, one or more quality indicator, such as a green, yellow, or red light or the like, is configured to provide an indication to a customer regarding the quality of one or more topping and/or collection of toppings.

In some embodiments, the system includes one or more projector, light source, or other means of projecting a light or other indication (each a "projector" 140) onto a monitored item, such as a topping, or adjacent to the same. In some embodiments, the projector 140 is positioned above the monitored item and/or is otherwise displaced from the monitored item. In some embodiments, a temperature sensor 130 serves as a projector and/or is positioned adjacent to and/or in close proximity to a respective projector 140. In this way, in some embodiments, alignment of a projector 140 and a respective temperature sensor 130 can be accomplished in a single step. In some embodiments, the projector 140 is configured to illuminate at least a portion of a monitored area, such as an area having a temperature outside of one or more temperature range. In some embodiments, the projector 140 is configured to display a message, such as a measured temperature value, a differential temperature value, an indication of a status of the monitored item, an instruction (such as to use, not use, replace, refill, stir, cool, heat, cover, uncover, or the like), or one or more other message or other indication. In some embodiments, the projector is configured to illuminate at least a portion of a monitored item with one or more color, such as a first, second, or third color associated with respective first, second, and third conditions. In some embodiments, the first, second, and third colors are green, yellow, and red, respectively, and the first, second and third conditions are associated with a measured and/or adjusted temperature value of a respective monitored item being within a first temperature range, being outside the first temperature range but within a second temperature range, or being outside the first and second temperature ranges, respectively.

In some embodiments, the system is configured to project a message, light, or other indication onto a surface positioned adjacent to a monitored item, such as onto a projection surface 145 adjacent to a bin 150 for holding one or more topping 10. In some embodiments, the projection surface 145 is positioned such that the projected indication is conspicuous to a user while being inconspicuous to and/or concealed from a customer. In some embodiments, the projection surface is positioned along a back surface of a bin 150. In some embodiments, the projection surface is generally perpendicular with a worker's line of sight or otherwise angled so as to be in a worker's line of sight while. In some embodiments, the projection surface is generally parallel to a customer's line of sight and/or is concealed from a customer's line of sight.

In some embodiments, the system is configured to prevent or otherwise inhibit access to a topping based on one or more temperature reading associated with the topping being outside of one or more range. In some embodiments, the system is configured to at least partially close a bin lid 155 based on a temperature of a respective topping being outside of a first temperature range, such as a preferred temperature range. In some embodiments, the system is configured to completely close a bin lid 155 based on a temperature of a respective topping being outside of a second temperature range, such as a required temperature range.

In some embodiments, the system is configured to automatically turn on one or more cooling or heating system and/or a rail system based on a set schedule and/or otherwise based on temperature of one or more monitored item. In some embodiments, the system is configured to automatically turn on a heating or cooling system and/or a rail system upon detection of a bin 150 or other monitored item being moved to a first configuration, such as by positioning such item onto a rail system of the present invention. In some embodiments, the system is configured to automatically turn off one or more cooling or heating system and/or a rail system based on a set schedule and/or otherwise based on temperature of one or more monitored item. In some embodiments, the system is configured to automatically turn off a heating or cooling system and/or a rail system upon detection of bins or other monitored items being moved away from a first configuration, such as by removing such items from a rail system of the present invention. In some embodiments, the system is configured to prevent or otherwise inhibit a heating or cooling system and/or a rail system from being turned to an off configuration if one or more monitored item is in a first configuration, such as when such items are positioned in or adjacent to a rail system of the present invention.

In some embodiments, one or more secondary system is utilized to verify that a topping is positioned in a correct location. In some embodiments, one or more camera, photo sensor, or the like is utilized to detect one or more property of the topping, such as a color, size, density, temperature, or the like. In some embodiments, first device is configured for determining a quantity or volume of a topping and one of the first device or a second device (such as a scale) is configured for determining a mass of associated toppings. In some embodiments, the system is configured to provide a warning or other indication to one or more user, such as a worker, a manager, a customer, or the like, if one or more topping or other monitored item is mislocated or otherwise contaminated (a "potential discrepancy"). In some embodiments, the system is configured to require a user input to verify one or more topping or other monitored item in one or more location, such as one or more location for which a potential discrepancy is determined. In some embodiments, the system is configured to prevent access to and/or otherwise inhibit access to one or more topping or other monitored item for which a potential discrepancy has been determined. In some embodiments, the system is configured to at least partially conceal and/or otherwise inhibit visibility of and/or access to one or more potential discrepancy.

In some embodiments, the system includes one or more proximity sensor or other sensor for detecting foreign objects, such as a worker's hands or arms. In some embodiments, the system is configured to analyze proximity data so as to determine whether a worker has interfaced with one or more item over a set period of time. In some embodiments, the system is configured to determine and/or predict periods of time within which no toppings are removed from and/or added to respective bins (each being an "inactive period"). In some embodiments, the system is configured to open or close one or more bin lid and/or one or more base lid associated with one or more inactive period. In some embodiments, the system is configured to associate temperature readings with respective active and inactive periods. In some embodiments, the system is configured to isolate unreliable readings, such as readings associated with a temperature reading of a foreign object during an active period (e.g. a worker's hand). In some embodiments, the system is configured to discard isolated readings and/or to otherwise minimize impact to measured and/or predicted temperature ranges associated with one or more monitored item.

In some embodiments, the system is configured to determine one or more rise profile for predicting one or more future potential temperature. In some embodiments, the system is configured to determine a first rise profile, such as a rise profile indicating that a temperature for lettuce is rising at x degrees per hour. In some embodiments, the system includes one or more threshold value for initiating an indication or otherwise providing a notification upon attainment of such threshold value. In some embodiments, one or more threshold value is determined based on one or more preferred temperature range for a respective monitored item, one or more required temperature range for the monitored item, one or more rise profile associated with the monitored item, one or more ambient condition, one or more system condition, mode, or the like, and/or one or more other value now known or later discovered for influencing a temperature and/or quality of such monitored item. In some embodiments, the threshold value associated with a rise profile is within preferred and/or required temperature range such that the system is configured to initiate remediation action prior to the temperature of the monitored item reaching a threshold value of such ranges.

In some embodiments, the system is configured to obtain and/or store thermodynamic properties of each monitored item so as to facilitate calculation of respective remediation threshold values. In some embodiments, one or more rise profile or other temperature characteristic is utilized in obtaining one or more remediation threshold value. In some embodiments, the system is configured to take remedial action by generating a warning or instruction to take action and/or by triggering an action, such as by triggering a super-cool mode, a super-chill mode, isolating one or more monitored item from ambient air or otherwise isolating the same, closing or opening a lid, or the like.

In some embodiments, the system is configured to self-diagnose and/or to allow one or more user or other system to diagnose the system, such as by monitoring one or more temperature reading, rise profile, system mode, ambient conditions, or the like. In some embodiments, the system includes one or more sensor on one or more compressor or other system operational components, or the like. In some embodiments, the system is configured to diagnose a performance of a compressor, or other component, or the like.

In some embodiments, the system is configured to provide instructions for maintaining a compressor, or other system component, or the like, such as instructing a user or other system to clean a compressor, recharge coolant, or the like. In some embodiments, the system is configured to generate one or more temperature range for a first monitored item based on one or more temperature range and/or one or more remediation threshold value of a second monitored item. In some embodiments, a first remediation threshold value associated with the first monitored item is an upper or lower threshold value of a first and/or second temperature range associated with the first monitored item.

In some embodiments, the present invention includes a method of monitoring and/or controlling or otherwise influencing temperatures associated with one or more topping, structure, and/or system of the present invention. In some embodiments, the method includes utilizing a monitoring system of the present invention. In some embodiments, the monitoring system is configured to monitor a base 100 having a plurality of bins 150 for holding a variety of toppings 10. In some embodiments, a map of the toppings 10 is developed by the monitoring system and/or is provided to the monitoring system. In some embodiments, the map includes temperature range information for at least some of the toppings. In some embodiments, each temperature range includes at least one of a preferred temperature range and an allowed temperature range. In some embodiments, a preferred temperature range is a temperature range within which it is preferable to keep the food item and an allowed temperature range is a temperature range within which it is required to keep the food item.

In some embodiments, a single temperature sensor 130 is configured to obtain temperature readings for a plurality of toppings 10 and/or at a plurality of locations associated with one or more monitored topping 10, structure, or system (each a "monitored item") of the present invention. In some embodiments, a plurality of temperature sensors 130 are configured to obtain a temperature reading for a single monitored item, such as by monitoring one or more location associated with the same. In this way, the present invention is configurable to provide flexibility when one or more sensor is damaged or unavailable, when one or more reading is inaccurate and/or requires verification, and/or as otherwise desired or required, such as to match or otherwise accommodate a layout of monitored items within one or more monitored zone.

In some embodiments, one or more temperature sensor 130 is installed onto a structure positioned above one or more monitored zone. In some such embodiments, the structure is a lid assembly, a rack, a support structure (such as for a glass partition), or the like. In this way, the temperature sensors 130 are capable of providing temperature readings for, and maintaining relatively unobstructed line of sight with, one or more monitored zone. In some embodiments, a single monitored zone contains a single monitored item. In other embodiments, a single monitored zone contains a variety of monitored items associated with a variety of preferred and/or allowed temperature ranges.

In some embodiments, the monitoring system includes a single temperature sensor 130. In other embodiments, the monitoring system includes a plurality of individually controlled temperature sensors 130. In still other embodiments, the monitoring system includes a plurality of temperature sensors 130, at least some of which are grouped together. In this way, the system is scalable and configurable so as to accommodate efficient and accurate temperature monitoring for small areas and large areas, as required. In some such embodiments, a single sensor or group of sensors is configured for use with a specific sized bin (e.g. a ⅙ sized bin); however, such sensor or group of sensors are capable of being combined with additional similarly configured sensors or groups of sensors to accommodate larger sized bins. For example, in embodiments in which each single sensor is configured to monitor a ⅙ sized bin, two ⅙ sized bins may be replaced with a ⅓ sized bin and two sensors are utilized together to monitor the larger bin. In some such embodiments, when multiple sensors or groups of sensor are combined together to accommodate larger sized bins, temperature readings are averaged and/or outlier temperatures are discard. In some embodiments, one or more temperature sensor of the present invention is configured to assist in creating or verifying a thermal imaging map or the like. In some embodiments, the system is configured to identify a plurality of thermal zones from a single image, stitch together a plurality of images associated with a single thermal zone, and/or otherwise identify one or more related thermal and/or imaging zone related to the same. In some embodiments, the system is configured to identify misplaced items, such as based on weight, color, thermal properties, or the like associated with such items. In some embodiments, the system is configured to identify optimum areas for location of one or more item, such as based on historical and current information. In some embodiments, a computer or other processing device of the system is configured to arrange or identify an arrangement of bins based on thermal or other information.

In some embodiments, the system is configured so as to associate first, second, and third sensors with respective first, second, and third bins, such as ⅙ size bins. In some embodiments, the system is configured so as to allow the first, second, and third sensors to be associated with a respective fourth bin, such as a ½ size bin that replaces the three ⅙ size bins. In some embodiments, the system is configured to average data associated with a plurality of associated sensors. In some embodiments, the system is configured to isolate outlier information by comparing two or more contemporaneous or non-contemporaneous reading.

In some embodiments, a plurality of temperature readings from one or more temperature sensor 130 are averaged together and/or are otherwise utilized together to determine a temperature value associated with a monitored item. In some such embodiments, a localized temperature value is compared to one or more temperature range and an average temperature value is compared with the same one or more temperature range and/or with one or more different temperature range. In some embodiments, the system provides a warning and/or alert associated with the average temperature and/or local temperature being outside of one or more respective temperature range.

In some embodiments, temperatures and/or other properties of ambient air and/or one or more item associated with a food item (each an "associated item") are utilized to estimate current temperatures of a monitored item and/or to predict future temperatures of a monitored item. In some such embodiments, the associated item is a utensil, a bin 150, a tray, a pan, or any number of other items that may be in contact with or close proximity to a monitored item such that it is capable of influencing the temperature of the monitored item. In some embodiments, factors associated with heat transfer, such as moisture levels in the air and/or otherwise associated with the monitored item (especially moisture levels in monitored food items), are determined to further refine temperature estimates and predictions. In some embodiments, the system provides a warning and/or alert associated with estimated and/or predicted temperatures being outside of one or more preferred and/or allowable temperature range.

In some embodiments, the system records and/or analyzes temperatures and/or other properties associated with a monitored item, ambient air surrounding the monitored item, and/or one or more associated item. In some such embodiments, the system utilizes recorded information to estimate current temperatures of a monitored item and/or to predict future temperatures of a monitored item. In some embodiments, the system provides a warning and/or alert associated with estimated and/or predicted temperatures being outside of one or more preferred and/or allowable temperature range.

In some embodiments, the system provides instructions or other information to a user of the system, thereby serving as a training device for the user and/or a digital assistant to the user. In some such embodiments, the system provides an instruction to chill, heat, cover, stir, uncover, remove, discard, and/or otherwise perform one or more function associated with one or more food item. In this way, the system of the present invention increases safety of food regardless of the training level of the user. In some embodiments, the system further includes a control system and one or more mechanism for causing one or more action, such as causing the system to chill, heat, cover, stir, uncover, cover, discard, and/or otherwise automatically perform one or more function associated with one or more food item. In this way, the system does not rely on a user to perform the function. In some embodiments, the system further includes one or more means of detecting and recording whether one or more function was completed and when such function was completed. In this way, the system is capable of assessing a local user's responsiveness to instructions and/or providing a means for a remote user to provide oversight to the local user. In some such embodiments, the system is further configured to determine and record whether any portion of a food item was added to and/or removed from the system (such as when replenishing product, discarding product, replacing product, and/or serving product) prior to the function being completed. In some such embodiments, one or more weighing system and/or other system is utilized to determine whether food was added to and/or removed from the system and/or when and how much food was added to and/or removed from the system.

In some embodiments, a heating or cooling function is a rapid heating or cooling function. In some embodiments, the system is configured to isolate the food products from ambient air and/or from a user, such as by closing a door of the system, thereby allowing the system to utilize one or more extreme thermodynamic process to either heat or chill items within the system. In some such embodiments, the extreme thermodynamic process includes causing a volume of gas, such as nitrogen or carbon dioxide, to expand within the system, thereby creating a low temperature environment within the system. In some such embodiments, the system is sealed and air is removed from the system prior to allowing the gas to expand within the system. In some embodiments, one or more bin and/or lid separates the food item from the gas.

In some embodiments, the system is configured to take a temperature reading during and/or upon completion of one or more function. In some such embodiments, the system is configured to take one or more temperature reading during and/or upon completion of a heating, chilling, or other thermodynamic function being completed, thereby determining the effectiveness of the related thermodynamic function and/or determining whether to continue the heating, chilling, or other respective function. In some embodiments, the system is configured to take a temperature reading during a stirring or other physical function, thereby obtaining a more accurate temperature reading of the item being stirred or otherwise physically influenced. In some embodiments, the system is configured to take a temperature reading before, during, and/or after a covering function and/or an uncovering function. In some embodiments, the system is configured to take a temperature reading before, during, and/or after food product is added to and/or removed from a bin, thereby obtaining additional temperature information of items remaining in the bin (thereby enabling the system to determine whether additional items should be removed and/or whether they can remain in the bin) and/or items added to the bin (thereby enabling the system to determine a temperature of new items and/or to determine how new items have and/or may affect temperature of other items).

In some embodiments, the system includes a number of audible and/or visual signals. In some embodiments, the system includes an alarm or other signal to provide an indication that the system is holding a desired temperature, such as a temperature within a preferred temperature range, and/or is falling (or rising as the case may be) outside of one or more temperature range, such as a preferred and/or allowed temperature range.

In some embodiments, the system provides visual depictions of measured, estimated, and/or predicted temperatures for one or more food item and/or food zone. In some such embodiments, the visual depiction provides one or more indication of one or more concern areas, thereby further assisting the user.

In some embodiments, the system provides a digital or printed map of food items positioned in one or more food zones. In some embodiments, the map is color coded or otherwise coded to indicate items that should be maintained at an elevated temperatures and items that should be maintained at lower temperatures. In this way, the system is capable of assisting a user in determining whether the products are placed in a logical manner. In some such embodiments, the system provides instructions for moving one or more item within a zone and/or to a different zone so that the items will be placed in a more logical manner. In other embodiments, the system includes one or more function for causing one or more item to be automatically moved to a more appropriate area. For instance, if a cold item is placed near a warm item, the system is configured to move the cold item away from a warming device when a warming device is being utilized to increase the temperature of the warm item (or to otherwise shield the cold item from heat associated with the warming device), thereby preventing the warming device from inadvertently increasing the temperature of the cool item.

In some embodiments, the system provides a color-coded map of one or more zone indicating the status of one or more food item in relation to a respective temperature range. In some such embodiments, the system displays a green color for food items that are within a respective preferred temperature range, a yellow color for food items that are outside of a respective preferred temperature range but that are still within an allowed temperature range, and a red color for food items that are outside of an allowed temperature range. In this way, a user can quickly and easily determine whether food items need to be discarded and/or whether food items are at a safe temperature.

In some embodiments, the system includes one or more sensor for determining whether one or more item is missing from a zone (such as a pan or bin that has been removed from a zone so that it can be refilled) and/or whether such item is located in the correct position. In some embodiments, the sensor is an optical sensor, a scanner, a camera, or the like. In some embodiments, the sensor is configured to detect one or more characteristic of the item, thereby confirming the presence of the item and/or the location of the item.

In some embodiments, the system includes one or more sensor for determining the quantity of an item in one or more zone or other location. In this way, the system is capable of determining whether a particular zone or other area is overloaded. In some embodiments, the system is further configured to determine and record times that food items are removed from a zone and the condition of the food item when it is removed from the zone. In this way, the system is capable of estimating what portion of the food item is discarded and what portion of the food item is sold or otherwise consumed. In some embodiments, information pertaining to waste and consumption rates is utilized by the system to determine optimum amounts of a particular food product and cycle schedules for moving food products into and/or out of food zones. In some embodiments, one or more food zone is a temperature controlled food zone, such as a freezer, a chiller, or a warmer.

In some embodiments, the system includes one or more motion sensor 170 for detecting movement of items in and out of one or more food zone. In this way, the system is capable of more accurately ensuring that temperature readings are not adversely affected by normal operation of the system and/or preparation, stocking, and/or serving of food items (e.g. when a worker's arm/hand enters the system). In some embodiments, one or more motion sensor 170 is utilized to assist in identifying discrepant temperature readings, such as temperature readings of a user's hand while reaching for a measured item and/or a user's arm while reaching over the measured item.

In some embodiments, the system further includes one or more sensor associated with preparation of food and/or otherwise manipulating the temperature of food. In some embodiments, the system is configured to detect moisture content of food and changes in moisture content of the food during one or more thermodynamic process, such as a cooking process, a chilling process, and/or a freezing process. In some embodiments, the system is further configured to determine and record an amount of time a food item is exposed to thermodynamic process and the conditions associated with such thermodynamic process, including one or more condition of the food product and one or more condition of one or more other item. In some such embodiments, the system includes a sensor for detecting change in one or more property of the item during the thermodynamic process, such as browning of a food item during a cooking process, decaying of food during a chilling process, or the like.

In some embodiments, the system includes one or more camera, sensor, or other means of monitoring one or more quality of a food item, such as freshness of the food item, decay of the food item, aging of the food item, or the like, each being associated with one or more freshness indication, aging parameter, or the like.

In some embodiments, the system monitors freshness over time. In some embodiments, the system is configured to anticipate freshness over time, such as by determining a current freshness quality of a food item and extrapolating an anticipated freshness quality at a future time based on a number of factors, including current and anticipated environmental and other conditions. In some embodiments, the system is configured to compare a first anticipated freshness quality with a subsequent anticipated freshness quality, such as by comparing a first freshness indication associated with a first time with a second freshness indication associated with a second time. In some embodiments, a freshness indication is a color of a food item, a moisture level of a food item, off-gassing associated with the food item, a density of a food item, crispness of a food item, or any other freshness indication now known or later discovered. In some embodiments, the means of monitoring one or more quality of a food item includes a means of monitoring one or more freshness indication of the same. In some embodiments, the means includes one or more visible light camera to detect browning, a gas sensor to detect off-gassing, or the like.

In some embodiments, the system is configured to measure or predict evaporation, drying out, or other adverse effects associated with one or more monitored item. In some embodiments, one or more gas sensor or the like is utilized to sense decay, aging, or the like of one or more food item. In some embodiments, the system is configured to mitigate adverse effects by initiating one or more event, such as by introducing periodic mists to such monitored item, periodically isolating the monitored item from ambient air, generating an alert or other warning, or the like.

In some embodiments, one or more alert of the present invention is associated with a temperature of one or more food item. In some embodiments, one or more alert is associated with a quality other than temperature, such as a freshness quality of the food item, decay of the food item, aging of the food item, or the like. In some embodiments, the system is configured to generate one or more alert associated with one or more quality being outside of a preferred or required range, such as one or more freshness indication, decay indication, and/or aging parameter being outside of one or more such range. In some embodiments, the system is configured to generate one or more warning or alert associated with anticipation of one or more quality being outside of a preferred or required range, such as anticipation of one or more freshness indication, one or more decay indication, and/or one or more aging parameter being outside of one or more such range. In some embodiments, one or more quality alert or warning is sent in conjunction with temperature information. In some embodiments, one or more quality alert or warning is independent of temperature information.

In some embodiments, a temperature of a food item, a temperature of ambient air, a temperature of a bin holding the food item, and a temperature of an adjacent food item or other adjacent item are each utilized in determining a current temperature and/or a predicted future temperature of a food item. In some embodiments, the system causes a powered lid or other structure of the system to close, thereby creating a controlled environment surrounding one or more food zone, thereby making it easier to control temperature changes, and further creating a barrier between a user and the food items, thereby preventing users from serving food that is at an unsafe temperature.

In some embodiments, one or more warning or signal is provided to a remote user located away from the food zones. In this way, the remote user is capable of monitoring temperatures of the food items. In some such embodiments, the remote user is capable of closing or opening a lid of the system, thereby providing the remote user with some level of control over the local user. In some embodiments, the system is configured to automatically close a lid or otherwise prevent a local user from accessing a food zone based on one or more criteria, such as a warning that goes unaddressed by the local user and/or the local user's failure to discard a food item. In some such embodiments, the system continues to prevent the local user from accessing the food zone until the remote user grants such access.

In some embodiments, information obtained from the system is recorded and logged for future reference. In some such embodiments, at least some of the information is configured to satisfy government and/or other regulations associated with food service and food prep. In some embodiments, the system includes one or more algorithm to distinguish temperature readings of one or more object. In some embodiments, the system obtains a first series of readings from a first sensor during a first period and compares each such reading to predetermined threshold values. In some embodiments, the system utilizes the first series of readings to predict future temperature values for the monitored item. In some embodiments, the system obtains information associated with ambient air, surrounding temperatures, system performance (such as charge, temperature, cleanliness, etc. associated with one or more cooling system, heating system, stirring system, or the like) for use in predicting future temperature values. In some embodiments, the system is configured to identify unreliable information (such as information associated with a user's hand or arm being positioned between a sensor and a monitored item when a reading is taken), such as by predicting an anticipated actual temperature value (or an anticipated other value, such as an anticipated quality or the like) associated with the same.

In some embodiments, one or more sensor is positioned relative to one or more food item so as to minimize obstructions, such as with a user reaching into the food prep area. In some embodiments, the system includes one or more feature for detecting obstructions and/or for determining a temperature of a food item despite the obstructions. For instance, in some embodiments the system is configured to obtain a first temperature measurement with a first unobstructed temperature sensor and is further configured to obtain a second temperature measurement with a second unobstructed temperature sensor if the first temperature sensor becomes obstructed. In other embodiments, the system is configured to detect an obstruction, to determine whether a reading has been influenced by an obstruction, and/or to discount or otherwise ignore temperature or other readings that have been influenced by an obstruction.

For instance, in some embodiments an operator's arm or other obstruction may prevent a specific temperature sensor from obtaining a temperature reading of a particular item. In some such embodiments, the system is configured to repurpose or otherwise cause another temperature sensor positioned at an unobstructed location to take a temperature reading. In other such embodiments, the system generates a warning or otherwise directs a user to move the obstacle so that an accurate reading can be obtained. In still other embodiments, the system is configured to discard or otherwise discount unreliable readings.

In some embodiments, the system includes a warning of rapid or otherwise unexpected changes to one or more item and/or of the ambient air. In this way, a local and/or remote user is provided with an indication of a potential issue. In some such embodiments, the system further calculates potential future temperature values of one or more item if the rapid or otherwise unexpected change persists or otherwise fails to improve. In this way, the system is capable of providing warnings associated with increased risks associated with such unexpected changes and/or can provide directions to a user to mitigate such unexpected changes. In some embodiments, the system is configured with one or more means of communicating information now known or later developed. In some embodiments, the system includes a central computer in data communication with one or more sensor or other component of the present invention, such as through direct communication and/or communication through one or more communication service and/or through one or more communication device.

In some embodiments, the system further includes one or more feature for increasing efficiency associated with accessing one or more topping, thereby decreasing heat transfer between food items and ambient air. In some such embodiments, the system includes an identification system, such as a lighting system, for identifying one or more food item associated with a current order. In some embodiments, the identification system is associated with a lid of each item, such as by including a light or other designation associated with each lid. In this way, a user is able to more quickly identify items for which lids must be replaced, making the user less likely to inadvertently remove the wrong lid. In some embodiments, the lid automatically opens when it is identified. In other embodiments, unidentified lids are prevented from opening.

Figure 11:
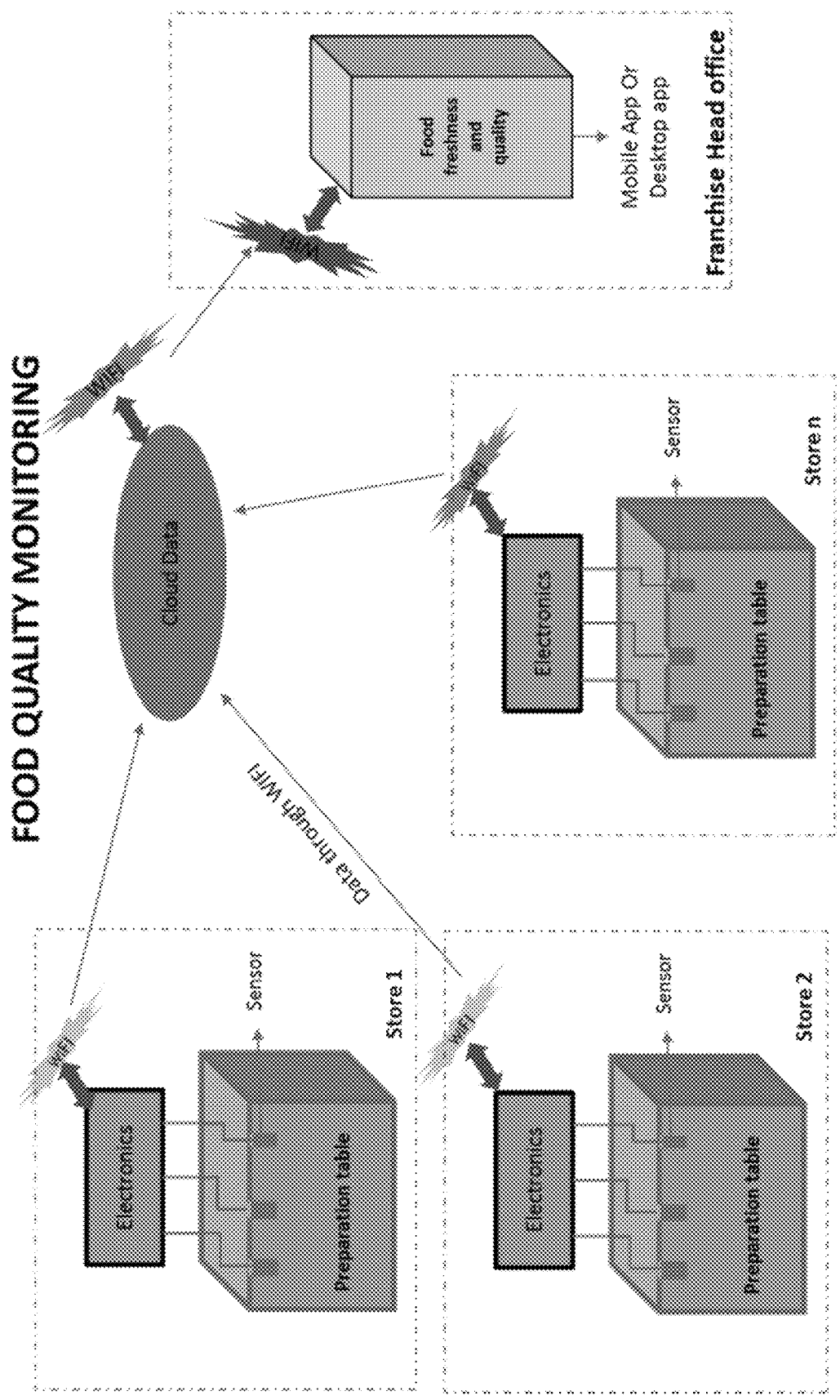
FIG. 11 is a schematic view of a monitoring system of the present invention.

Referring to FIG. 11, in some embodiments, the present invention includes a system for and a method of monitoring temperature, quality, or the like. In some embodiments, the system includes a mobile app or other means of obtaining and monitoring one or more parameter associated with a plurality of remote locations, such as a plurality of store locations. In some embodiments, each remote location includes one or more prep table or the like that is in data communication with a central location, such as a monitoring station, a cloud computing station, or the like. In some embodiments, each prep table is in wired or wireless (i.e. wifi, Bluetooth, cellular, or the like) communication with a network, such as the internet, an intranet, or the like. In some embodiments, a remote device, such as a computer, tablet, mobile device, or the like, is in data communication with one or more prep table, such as through a monitoring station, a cloud computing station, or the like. In some embodiments, the remote device is configured to receive information from and/or send information to the same. In this way, a remote user can monitor and/or control a plurality of prep table at a plurality of locations.

In some embodiments, the present invention includes an intelligent alarm monitoring algorithm. In some embodiments, one or more probe, such as one or more infrared probe or the like is configured to monitor temperatures associated with one or more product, such as a surface temperature of the product and/or a pan associated with the product. In some embodiments, the probes are placed at a height of about 1 foot above the product and/or pan. In other embodiments, the probes are placed further away from the product/pans. In yet other embodiments, the probes are placed closer to the product/pans.

In some embodiments, the present invention utilizes one or more algorithm to determine whether a reading is associated with a monitored item or a foreign object, such as an arm or the like. In some embodiments, the system identifies and/or tracks movement of foreign objects in and around a monitored item. In some embodiments, the system monitors and/or predicts temperatures of one or more foreign object and/or compares a measured temperature of such objects against the actual temperature of a monitored item. In some embodiments, the algorithm identifies temperature changes associated with occlusion of the line-of-sight by a foreign object. In some embodiments, the foreign object is an appendage or limb of a human body. In some embodiments, when the monitoring algorithm detects a temperature reading associated with a foreign object, the system ignores or discounts such reading. In this way, the system avoids production of false alarms associated with such occlusions, such as false temperature-change warning alarms which would otherwise be activated.

In some embodiments, a number of temperature samples are taken and stored in an array. In some embodiments, the samples are collected up to 60 seconds for each probe. In some embodiments, the samples are stored for longer than 60 seconds. In some embodiments, once an array is full, new temperature samples replace the oldest temperature sample. In such an embodiment, the overall samples in the array remains constant.

Figures 12, 13:
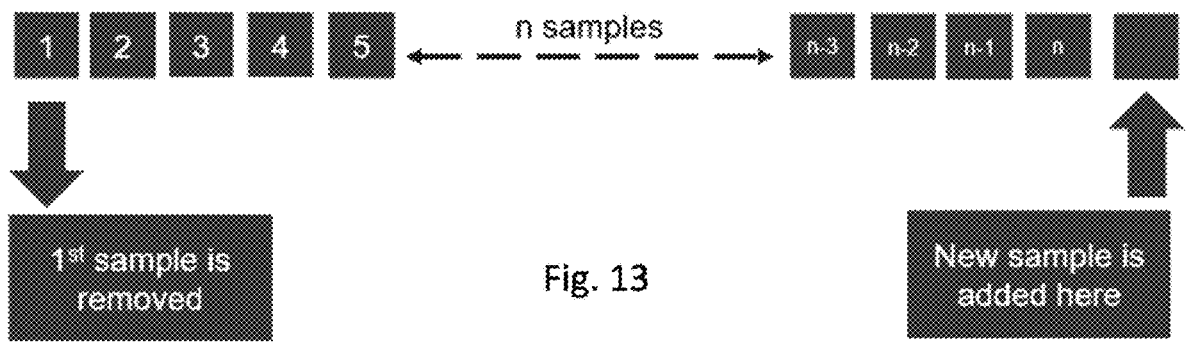
FIG. 12 is a chart displaying temperature regions/ranges and associated alarms according to some embodiments of the present invention.
FIG. 13 is a diagram depicting sample logic according to some embodiments of the present invention.

Referring to FIG. 12, in some embodiments, each sample is associated with one of a plurality of regions. In some embodiments, there are six regions. In some embodiments, a first region is a low-error region, such as a low temperature error region associated with a first temperature range, such as a temperature range below 32 degrees Fahrenheit. In some embodiments, a second region is a low-warning region, such as a low temperature warning region associated with a second temperature range, such as a temperature range between 32 and 34 degrees Fahrenheit. In some embodiments, a third region is an ideal region, such as an ideal temperature region associated with a third temperature range, such as a temperature range between 34 and 38 degrees Fahrenheit. In some embodiments, a fourth region is a high-warning region, such as a high temperature warning region associated with a fourth temperature range, such as a temperature range between 38 and 40 degrees Fahrenheit. In some embodiments, a fifth region is a high-medium error region, such as a high-medium temperature error region associated with a fifth temperature range, such as a temperature range between 40 and 50 degrees Fahrenheit. In some embodiments, a sixth region is a high-error region, such as a high temperature error region associated with a sixth temperature range, such as a temperature range above 50 degrees Fahrenheit.

Figures 14, 15:
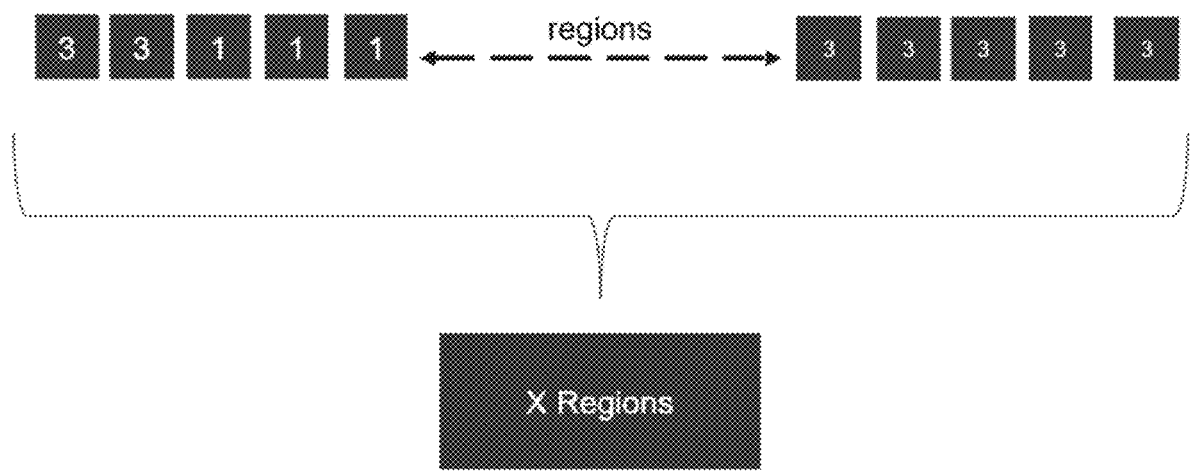
FIG. 14 is a diagram depicting region logic according to some embodiments of the presenting invention.
FIG. 15 is a diagram depicting indexing logic utilizing temperature and region according to some embodiments of the present invention.

Referring to FIGS. 13, 14, and 15, In some embodiments, the system stores readings along with associated region information, such as by storing such information in an array or the like. In some embodiments, the system is configured to compare a plurality of stored readings and/or associated region information so as to determine whether to perform one or more function, such as produce an alarm, provide a warning, initiate mitigation efforts, or the like. In some embodiments, the system is configured such that one or more function is performed only if a predetermined number of similar readings are received and/or if one or more reading is received for a predetermined period of time. In some embodiments, if the continuous sample readings over a predefined period of time are from the same region, then the system performs a function association with such region, such as setting a probe alarm associated with such region. In some embodiments, a status of the system, such as a probe's alarm status, will not change unless continuous sample readings over a predetermined period of time are associated with a region that is different from a region associated with a status of the system. In some instances, the predetermined period of time is 5 seconds. In some instances, the predetermined period of time is a minute.

Some embodiments of the present invention also include a method to define a layout for preparation table schema.

Figures 18, 19:
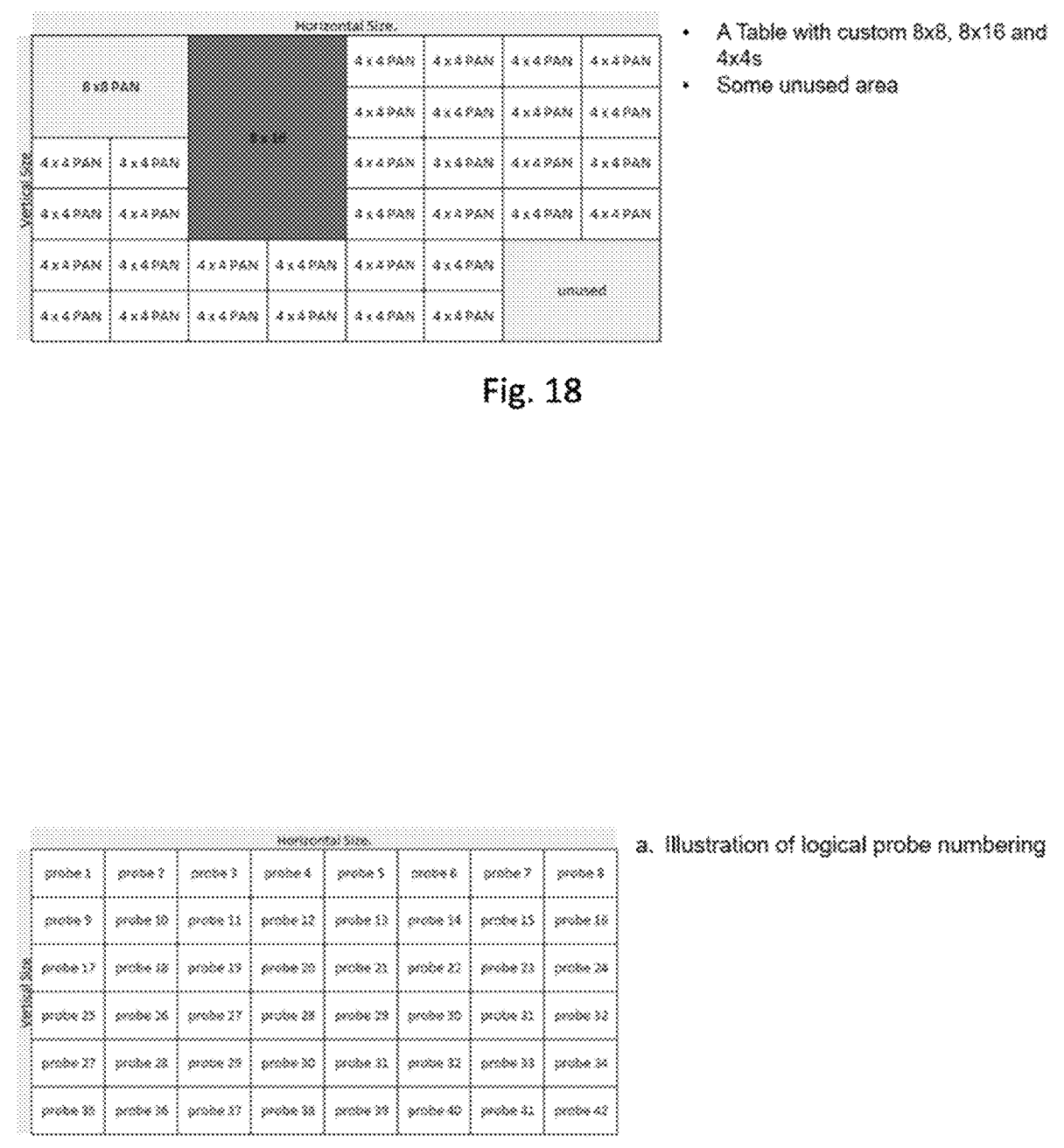

The method is an effective way to allow a user to reorganize a layout of a preparation table and assign probes by product or other identification means. In some embodiments, the method utilizes software which allows for creating and defining of Layouts for the current preparation table. Referring to FIGS. 16-18, in some embodiments, the table layout can accommodate a plurality of pans over a predetermined area, such as pans occupying regions ranging from 4 inches by 4 inches through 15 inches by 15 inches. In some embodiments, the software provides the user with options to define one or more parameter, such as the height and width of the preparation table. In some embodiments, the system is configured to allocate a pan based on one or more parameter, such as by allocating pans of sizes 4 inches by 4 inches to the preparation table. In some embodiments, the software provides options to first configure the dimensions of the table. In some embodiments, a user is able to manually merge default pan sizes to form pan sizes of a larger dimension. In some embodiments, all pan allocation dimensions are multiples of 4 inches.

Some embodiments of the present invention also include a method for assigning probes, such as temperature probes. In some embodiments, the method includes utilization of one or more user interface. In some embodiments, the system internally maps a plurality of probe numbers associated with a plurality of pans once a layout for preparation table schema is changed by an operator and saved. Referring generally to FIG. 19, in some embodiments, the probes are mapped to the pan layout one to one. In some embodiments, the final temperature probe readings for food items, or other items, associated with a given pan are determined by averaging the probes directed toward such pan. In some embodiments, the system utilizes an algorithm to arrive at probe assignments for temperature measurements. In some embodiments, the algorithm is a clustering, K-Nearest Neighbor, or other organization algorithm now known or later developed.

Some embodiments of the present invention also include a speech recognition system. In some embodiments, the system has interfaces to enable voice-based identification using speech recognition. In some embodiments, the system captures voice data from a user. In some embodiments, voice data is enhanced using an application, such as an artificial intelligence application. In some embodiments, this application is associated with Cloud Services from Azure, Amazon, or similar services now known or later developed. In some embodiments, the speech system enables the system to interact with the operator to provide responses to operator questions such as identifying temperature readings, providing historical data, or the like.

Figure 22:
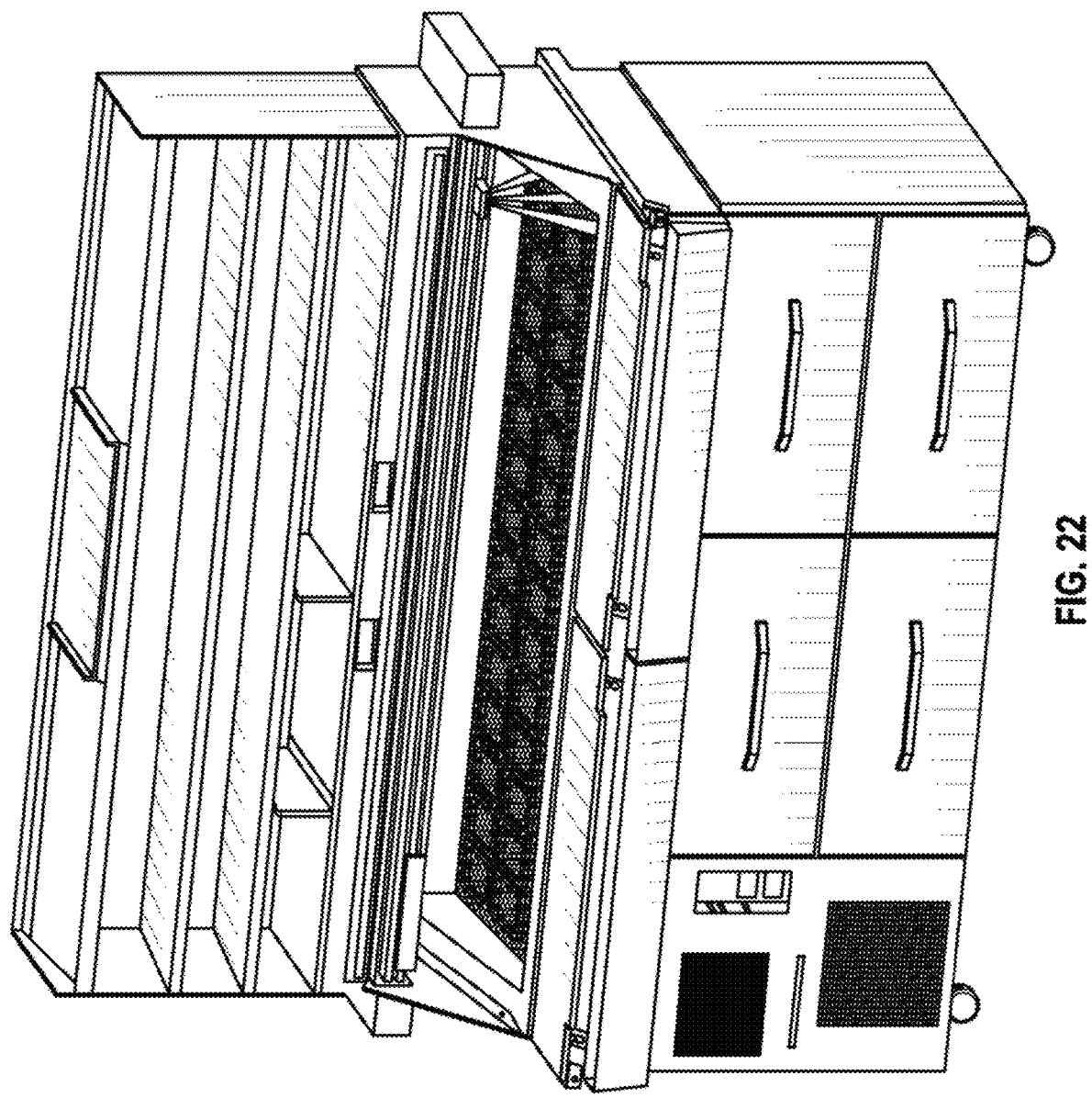
FIG. 22 is a front perspective view of a lighting system according to some embodiments of the present invention.
Figure 23:
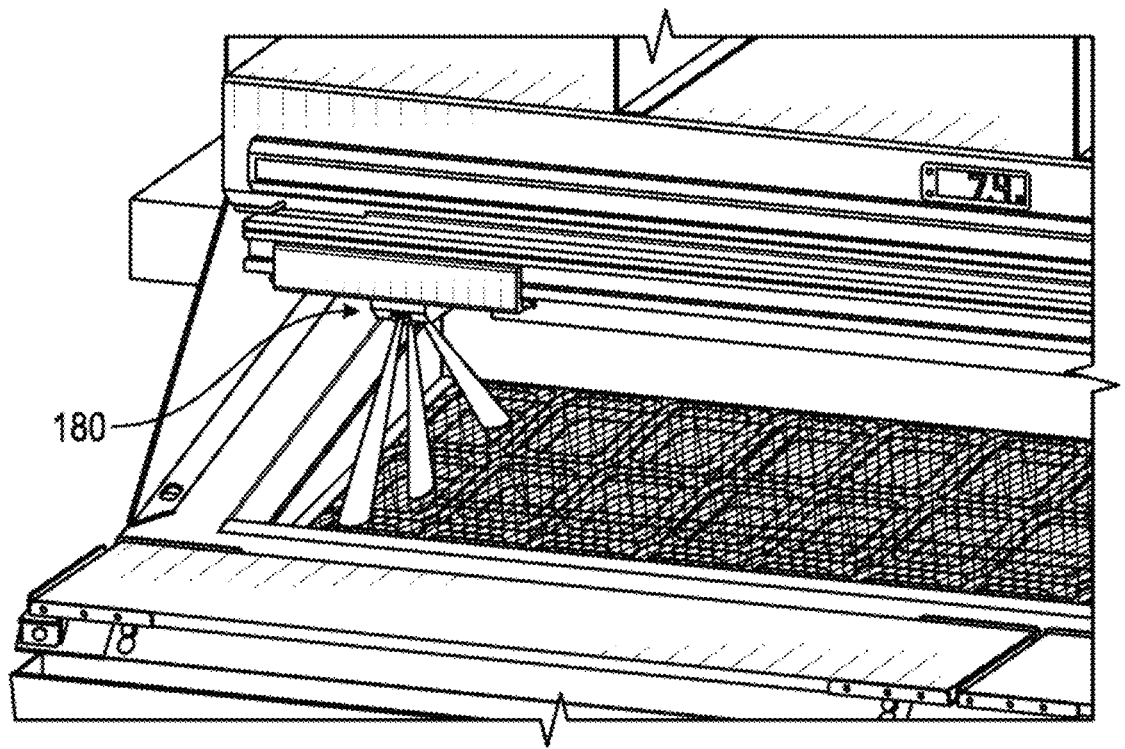
FIG. 23 is a front perspective view of the lighting system of FIG. 22, shown in a first position.
Figure 24:
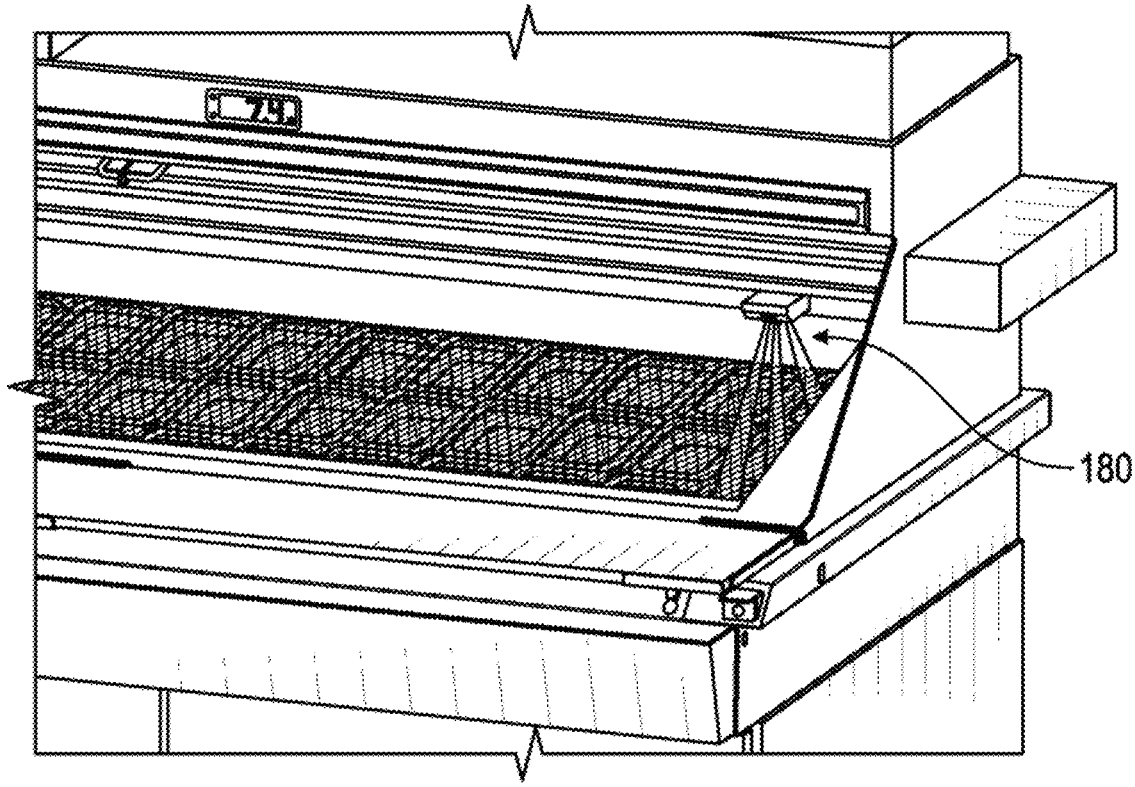
FIG. 24 is a front perspective view of the lighting system of FIG. 22, shown in a second position.

Referring to FIG. 22, some embodiments of the present invention also include a lighting system. In some embodiments, the system is a selective lighting system. In some embodiments, the system is a sequential lighting system. In some embodiments, the system helps a user build a culinary item with proper ingredients in the proper order. In some embodiments, the system follows a recipe. In some embodiments, the system resides relative to an ingredient array. In some embodiments, the system resides above an ingredient array. In some embodiments, elements of the system move relative to the ingredient array, such as is depicted in FIGS. 23 and 24. In some embodiments, this movement is axial movement, while in other embodiments this movement is rotational movement. In some embodiments, the system moves both axially and rotationally. In some embodiments, such movement is restricted to one axis of movement relative to the ingredient array.

Figure 25:
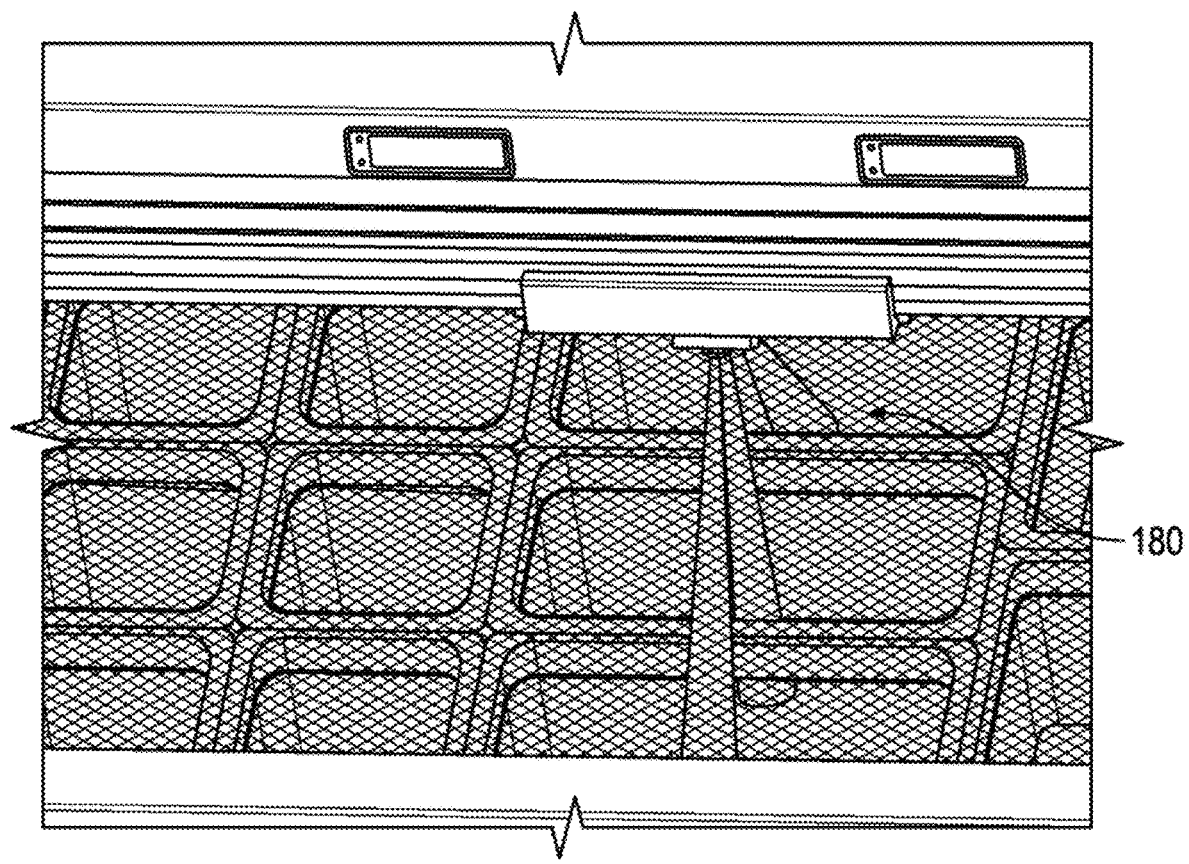
FIG. 25 is a front perspective view of the lighting system of FIG. 22, shown with three light projections.
Figure 26:
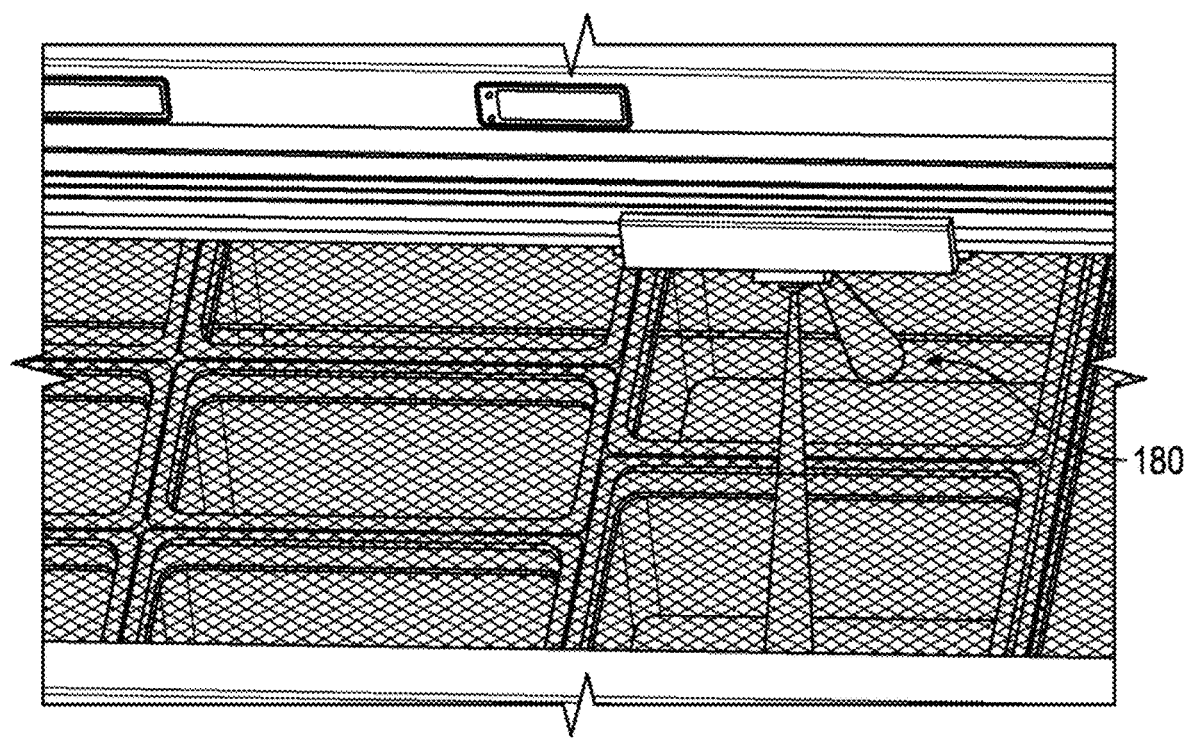
FIG. 26 is a front perspective view of the lighting system of FIG. 22, shown with two light projections.
Figure 27:
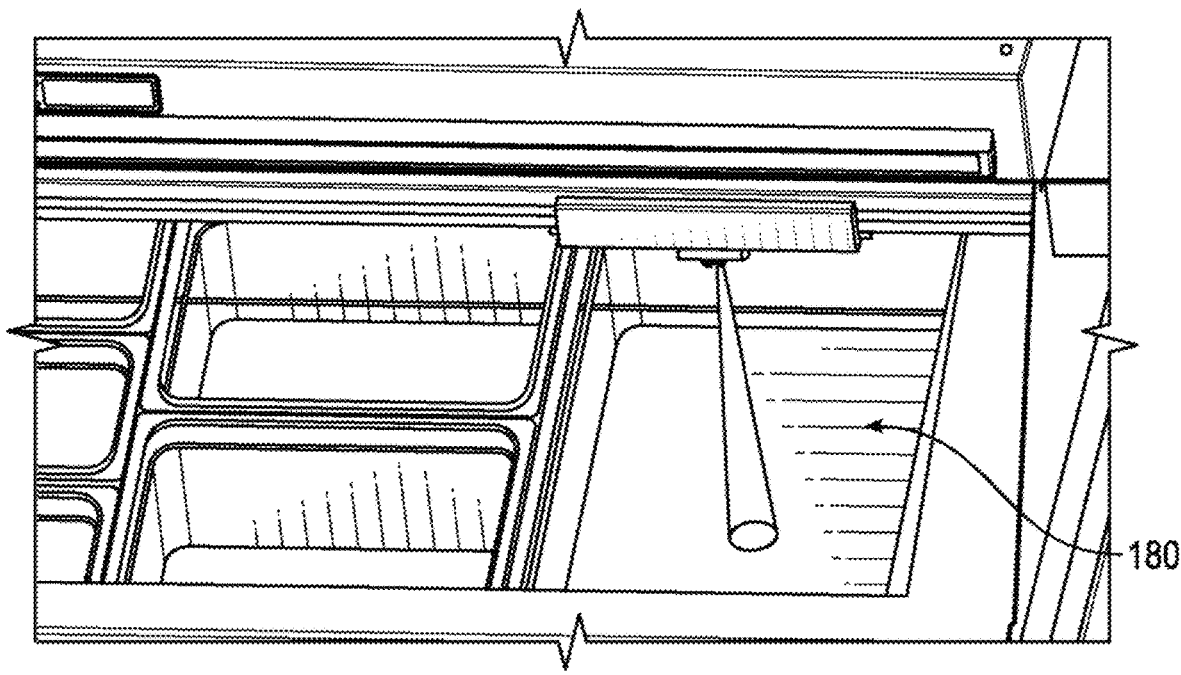
FIG. 27 is a front perspective view of the lighting system of FIG. 22, shown with one light projection.

In some embodiments, the system resides relative to an ingredient array. In some embodiments, the ingredient array is segmented into a plurality of bins. In some embodiments, the plurality of bins can be configured into a first layout within the ingredient array. In some embodiments, the plurality of bins can be reconfigured into a second layout within the ingredient array. In some embodiments, a bin is sized to occupy the entirety of the ingredient array. In some embodiments, a bin is sized to occupy a less-than-entire portion of the ingredient array. In some embodiments, the plurality of bins are of different sizes. In some embodiments, the bins contain a variety of ingredients for food preparation. Regardless of bin size, the system is configured to illuminate the contents of each bin. For example, in some embodiments, the bins are full sized bins such as in FIG. 27. In some embodiments, the bins are ½ sized bins, such as in FIG. 26. In some embodiments, the bins are ⅓ sized bins, such as in FIG. 25. In some embodiments, the bins are ⅙ sized bins, such as generally shown as not illuminated in FIG. 25. In some embodiments, the bins are ⅑ sized bins, as generally shown in FIGS. 22-24.

Figure 28:
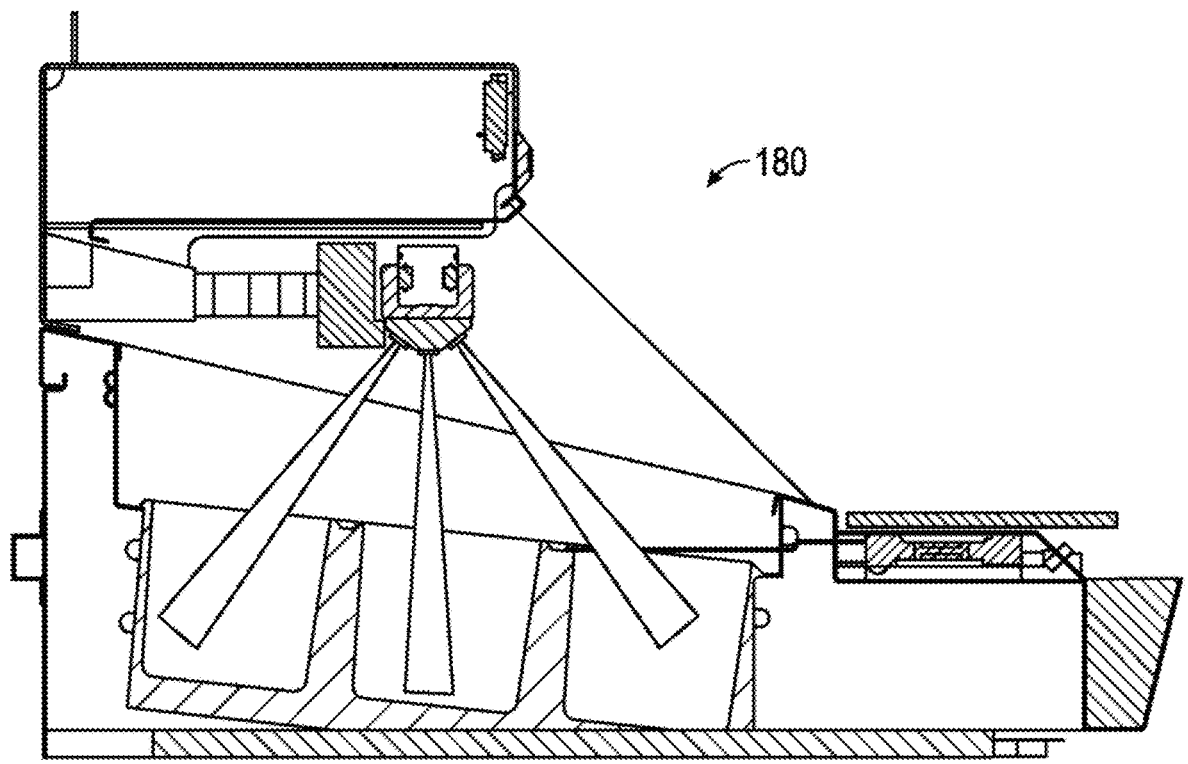
FIG. 28 is a left side section view of the lighting system of FIG. 22, shown with three light projections.
Figure 29:
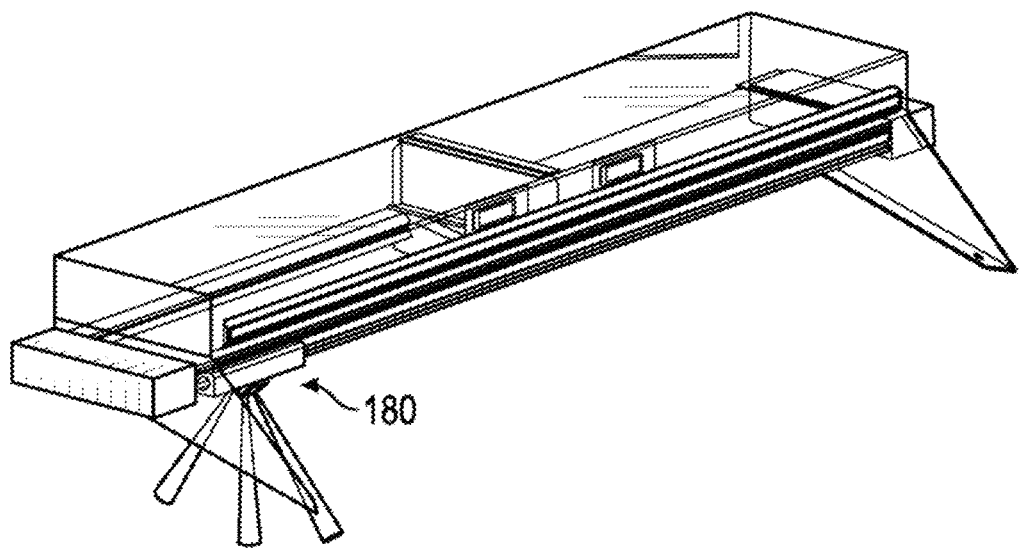
FIG. 29 is a front perspective view of a lighting system according to some embodiments of the present invention, shown in a first position.
Figure 30:
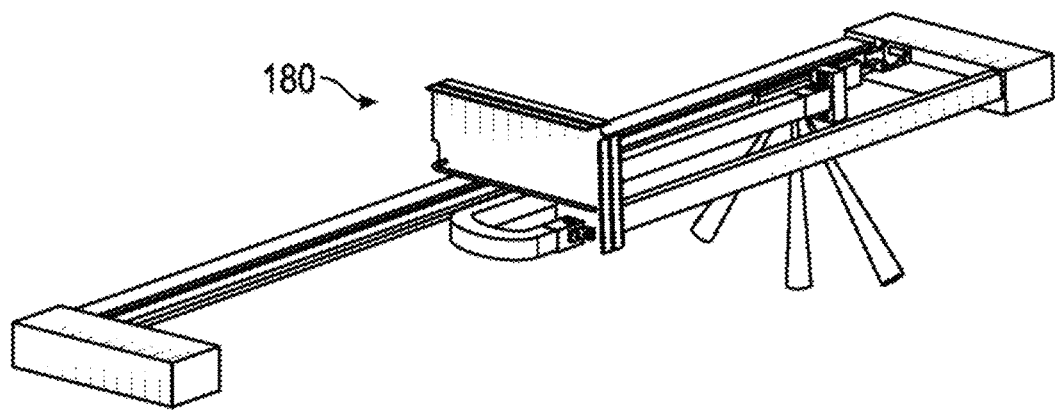
FIG. 30 is a rear perspective view of the lighting system of FIG. 29, shown without cover.

Referring to FIGS. 28-30, in some embodiments, the system includes a main support. In some embodiments, the main support sits above an ingredient array containing one or more bins of various size. In some embodiments, the main support is integrated into a housing. In some embodiments, this housing is a modified hood cover assembly. In some embodiments, the main support is free-standing. In some embodiments, the main support is oriented parallel to an x-axis of the ingredient array. In some embodiments, the main support is oriented parallel to a y-axis of the ingredient array. In some embodiments, the main support is centered relative to the ingredient array. In some embodiments, the main support is off-center relative to the ingredient array.

Still referring to FIGS. 28-30, in some embodiments, the main support is generally rectangular in cross section. In some embodiments, the main support is generally circular in cross section. In yet some other embodiments, the main support takes on a unique geometric cross section. In some embodiments, the main support is configured to receive a carriage 180. In some embodiments, the main support is configured to allow a carriage 180 to move along the length of the main support. In some embodiments, this movement is along a railing associated with the main support. In some embodiments, this movement is facilitated by a motor. In some embodiments, this motor is located on the carriage 180. In some embodiments, this motor is located at the end of the main support. In some embodiments, this motor is located at a location remote from the main support. In some embodiments, the motion system is a v-slot system, a chain-driven system, a lead screw system, or other motion system as known by those ordinarily skilled in the art of motion systems.

In some embodiments, the light system includes a carriage 180. In some embodiments, the carriage 180 is configured to interface with main support of the system. In some embodiments, the carriage 180 is configured to move axially along the length of the main support. In some embodiments, the carriage 180 is configured to rotate around the main support of the system.

In some embodiments, the carriage 180 is configured to receive one or more accessories. In some embodiments, these one or more accessories are oriented to generally face the ingredient array when they are attached to the carriage 180. In some embodiments, these accessories are angled relative to a vertical axis of the ingredient array. In some embodiments, the carriage 180 is configured to receive accessories at a variety of angles, such that the accessories may point generally to all areas of the ingredient array. In some embodiments, the accessories are lights. In some embodiments, the accessories are touchless temperature sensors. In some embodiments, the carriage 180 is configured to receive both light accessories and touchless temperature sensor accessories. The present invention contemplates that the carriage 180 accessories could be a wide array of food preparation and monitoring accessories as are known by those ordinarily skilled in the art.

In some embodiments, the main support is rotatable above the ingredient array. In some embodiments, the carriage 180 is rotatable about the main support. In such rotational embodiments, a single accessory is enabled to point towards all areas of the ingredient array. In some embodiments, the rotation is sufficient such that each accessory of a plurality of accessories are capable of pointing at all areas of the ingredient array. In such embodiments, in the event of failure of one accessory, the system is configured to compensate for the failure and utilize the remaining operable accessories to retain normal function. In some embodiments, such a failure would be automatically recognized. In some embodiments, a user would input into the system that a failure had occurred. Such functionality lessens the risk of downtime in the event of the failure of a singular accessory.

In some embodiments, the system is configured to illuminate the contents of bins arranged in ingredient array. In such an embodiments, the system utilizes light accessories to illuminate the bins. In some embodiments, the carriage 180 moves to a variety of 'rows' of bins arranged in an ingredient array to facilitate illumination of the contents. In some embodiments, the bins are of different sizes. In some embodiments, different accessories associated with the carriage 180 may need to be activated to illuminate the bins depending on the layout of the bins within the ingredient array.

In some embodiments, the system includes at least one sensor. In some embodiments, the sensor is a weight sensor, a photoelectric sensor, a motion detection sensor, or similar environmental measuring sensor. In some embodiments, a multitude of sensors are used. In some embodiments, all sensors are the same type of sensor. In some embodiments, a multitude of sensors includes different types of sensor. In some embodiments, the sensors communicate environmental information to the system. In some embodiments, the at least one sensors can be placed on the carriage 180, on the main support, on the housing for the main support, or can be placed somewhere else when deemed advantageous.

In some embodiments, the system assists a user in preparation of an item. In some embodiments, the item is a culinary item. In some embodiments, the system is preloaded with recipes for various food items. In some embodiments, the system has a user interface. In some embodiments, a user can input the layout of bins within the pan. In some embodiments, a user can identify ingredients contained within each bin and inputs those into the user interface. In some embodiments, the system utilizes sensor accessories to automate the identification of the bin layout. In some embodiments, the system utilizes sensor accessories to automate identification of bin contents. In some embodiments, a user can input a custom recipe into the system via the user interface.

Figure 31:
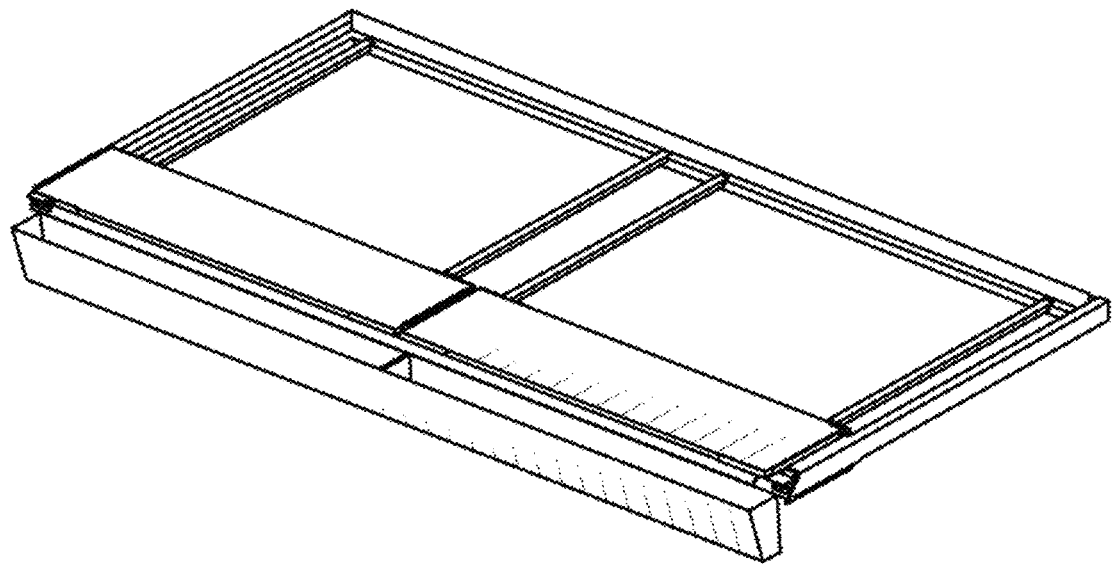
FIG. 31 is a front perspective view of a base associated with a lighting system as depicted in FIG. 22.
Figure 32:
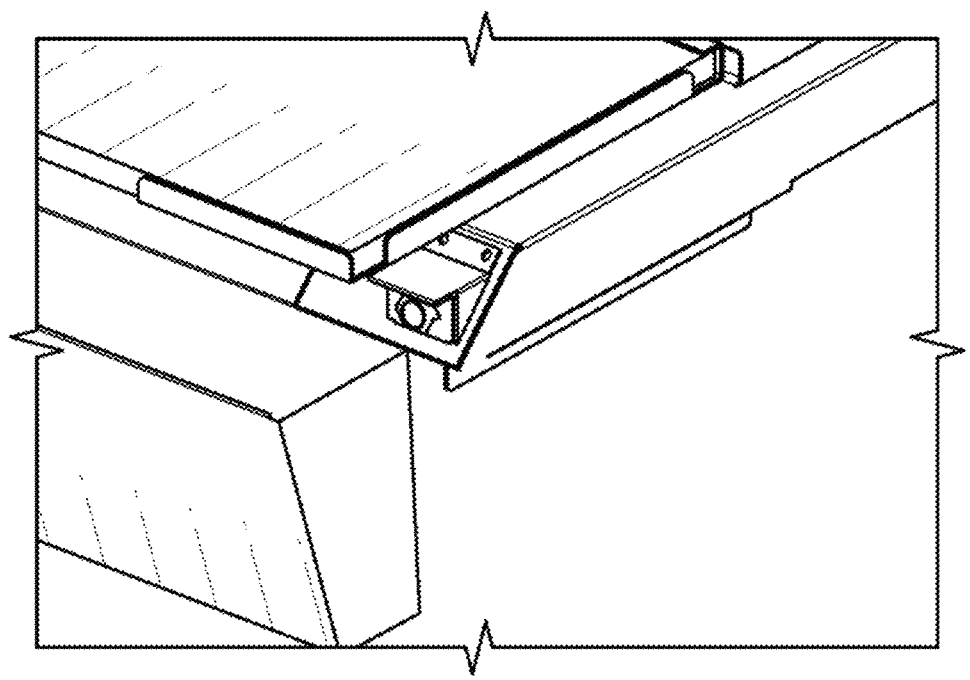
FIG. 32 is a detail view of a tare button on the base shown in FIG. 31.
Figure 33:
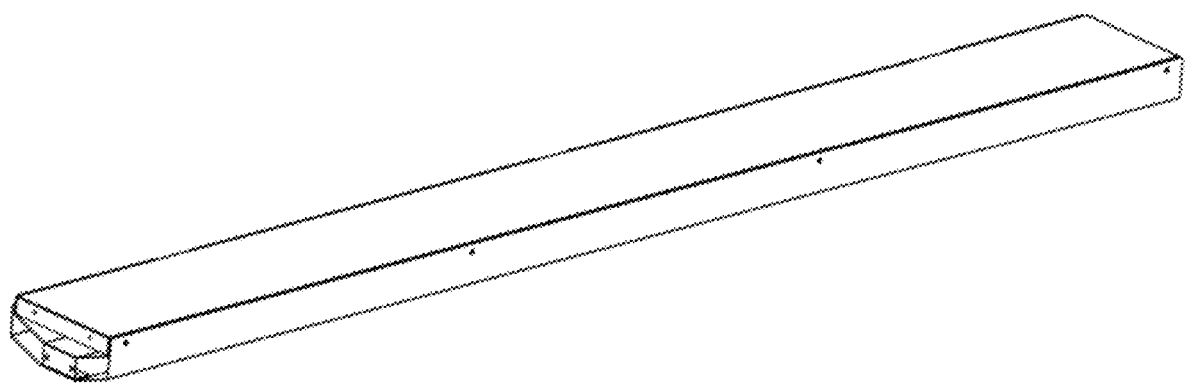
FIG. 33 is a front perspective view of a light box according to one embodiment of the present invention.
Figure 34:
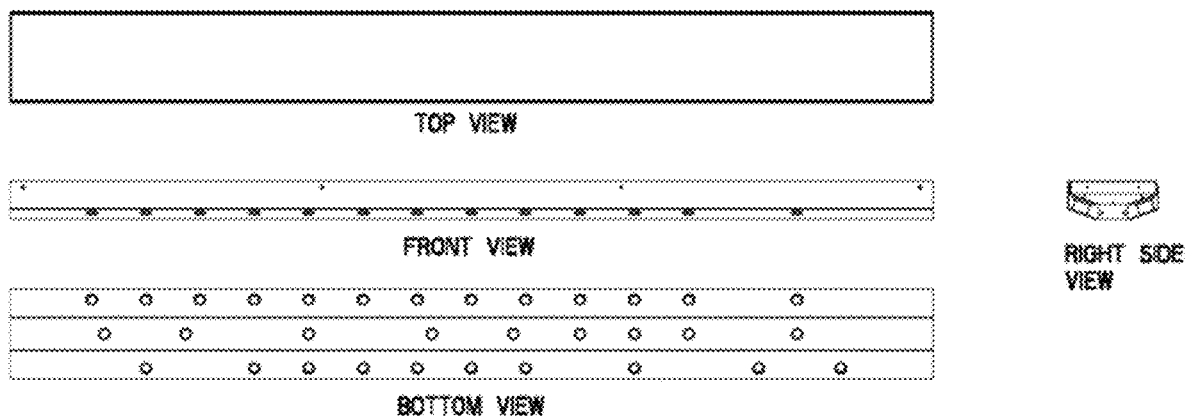
FIG. 34 shows top, front, bottom, and right side views of the light box of FIG. 33.
Figure 35:
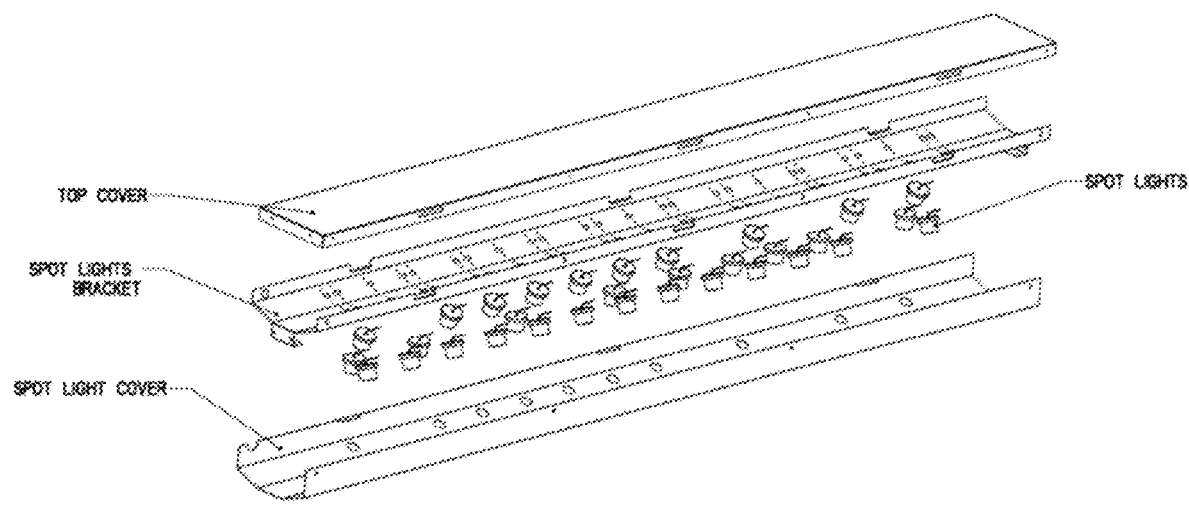
FIG. 35 shows an exploded, front perspective view of the light box of FIG. 33.
Figure 36:
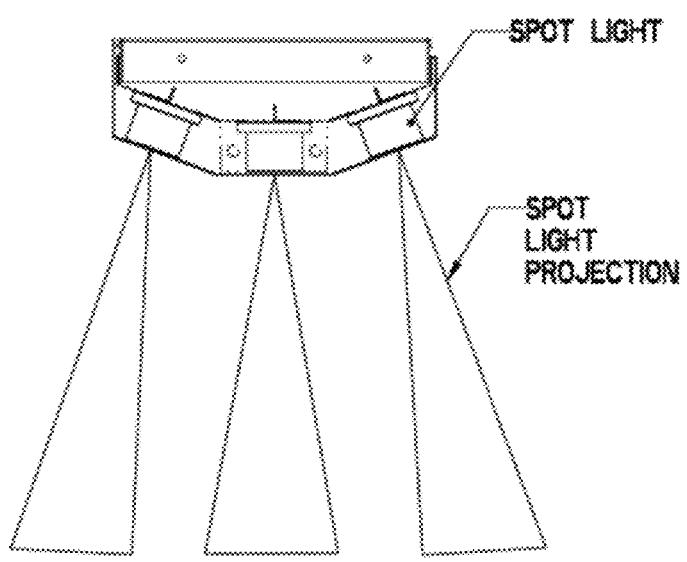
FIG. 36 shows a side view of the light box of FIG. 33, shown with light projections.
Figure 37:
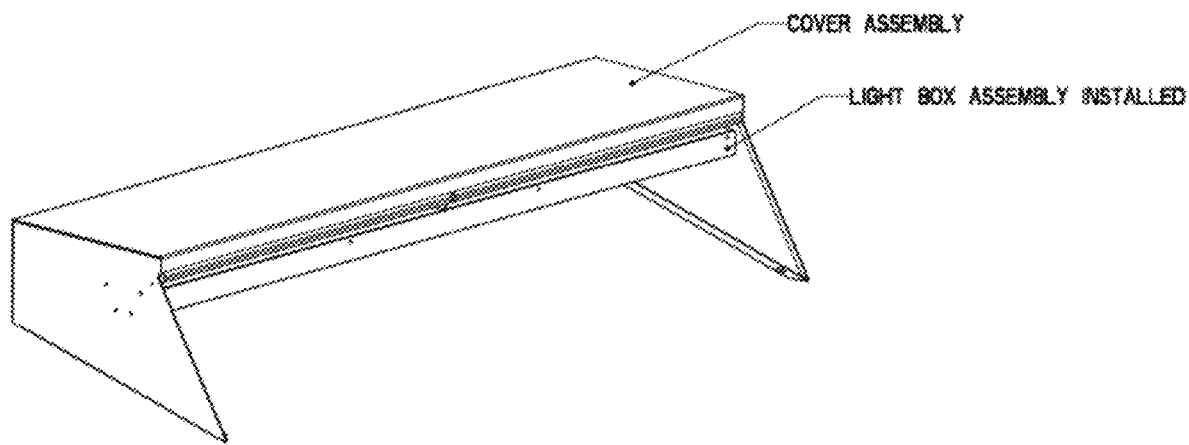
FIG. 37 shows a front perspective view of the light box of FIG. 33 installed within a cover assembly, according to one embodiment of the present invention.
Figure 38:
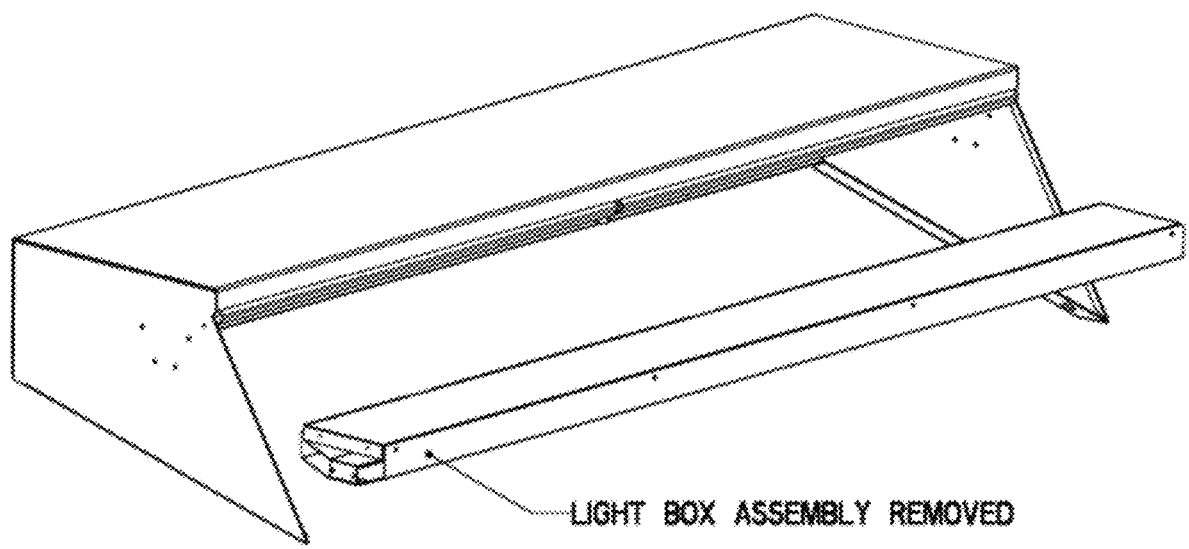
FIG. 38 shows a front perspective view of the light box and cover assembly of FIG. 37, in a disengaged configuration.
Figure 39:
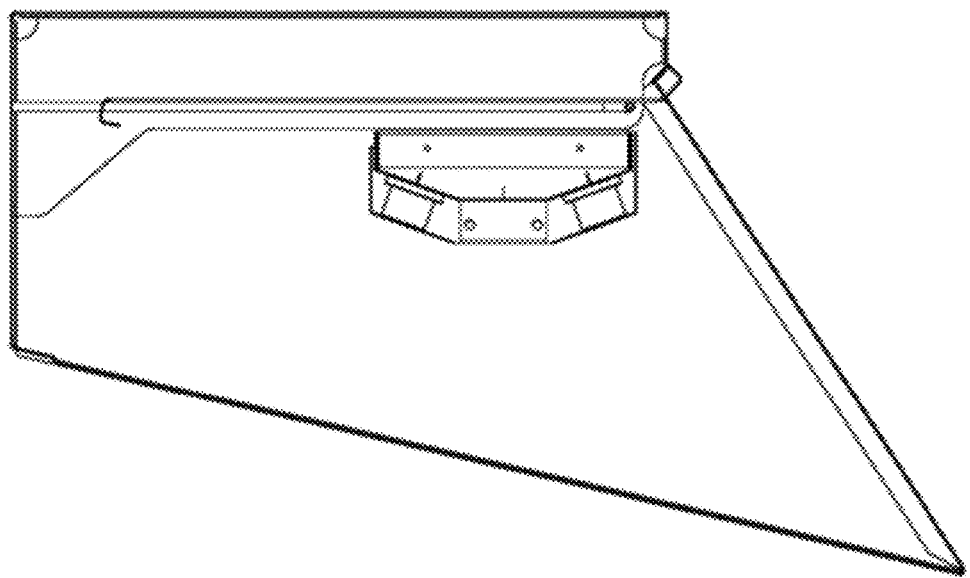
FIG. 39 shows a side-sectional view of the light box and cover assembly of FIG. 37
Figure 40:
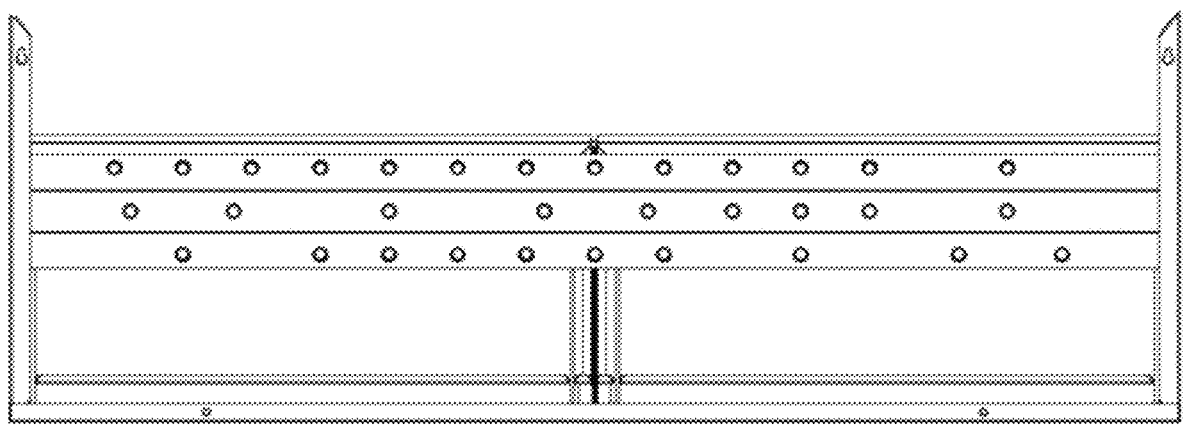
FIG. 40 shows a bottom view of the light box and cover assembly of FIG. 37.

In some embodiments, the system selectively and sequentially lights bins oriented in an ingredient array to illuminate a particular ingredient contained within a bin. In some embodiments, the system is following an order of ingredients as outlined in a recipe. In doing so, the system identifies the illuminated ingredient as the next ingredient in a recipe. In some embodiments, this is achieved through a single light accessory. In some embodiments, this is achieved through a plurality of light accessories. In some embodiments, the particular ingredient will stay illuminated until a target condition is met. In some embodiments, the target condition is the activation of a motion sensor which detects that the ingredient was accessed by a user. In some embodiments, the target condition is a certain weight of ingredient accessed by a user. In such embodiments, a user will weight out ingredients on a weight sensor, such as the work surface depicted in the FIGS. 31 and 32, until a target weight has been reached. The present invention contemplates a wide variety of target conditions related to the standardized preparation of food as would be known to one ordinarily skilled in the art of food preparation.

In some embodiments, the carriage 180 carries touchless temperature sensors instead of lights. In such embodiments, the system can operate as a touchless temperature monitor for food product stored in bins. In some embodiments, the system operates with functionality as discussed herein relevant to touchless temperature monitoring and warning. In some embodiments, the modified carriage 180 greatly reduces the number of temperature sensors necessary to achieve the same touchless temperature monitoring and warning capabilities as discussed herein.

In some embodiments, the system can identify the layout of bins within an ingredient array automatically. In some embodiments, the system utilizes touchless temperature sensors to identify food layout. In some embodiments, the system first measures and stores the ambient temperature. In some embodiments, the system then iteratively scans small sections of the ingredient array. In such embodiments, the system continues iteratively scanning small sections until the entirety of the ingredient array is analyzed. In some embodiments, the iterative scanning develops a heat-map of the ingredient array. In some embodiments, the system analyzes the heat map of the ingredient array and identifies areas which are hotter or colder than the ambient temperature. In some embodiments, the system identifies clumping patterns in relatively hotter or colder areas. In some embodiments, these clumping patterns are utilized to generate a layout of bins within the ingredient array. Similarly, in some embodiments, the system utilizes visual sensors to scan the identified bin layout and visually identify the food product located within the identified bins. Such embodiments minimize user intervention and subsequently minimize system downtime.

Figure 20:
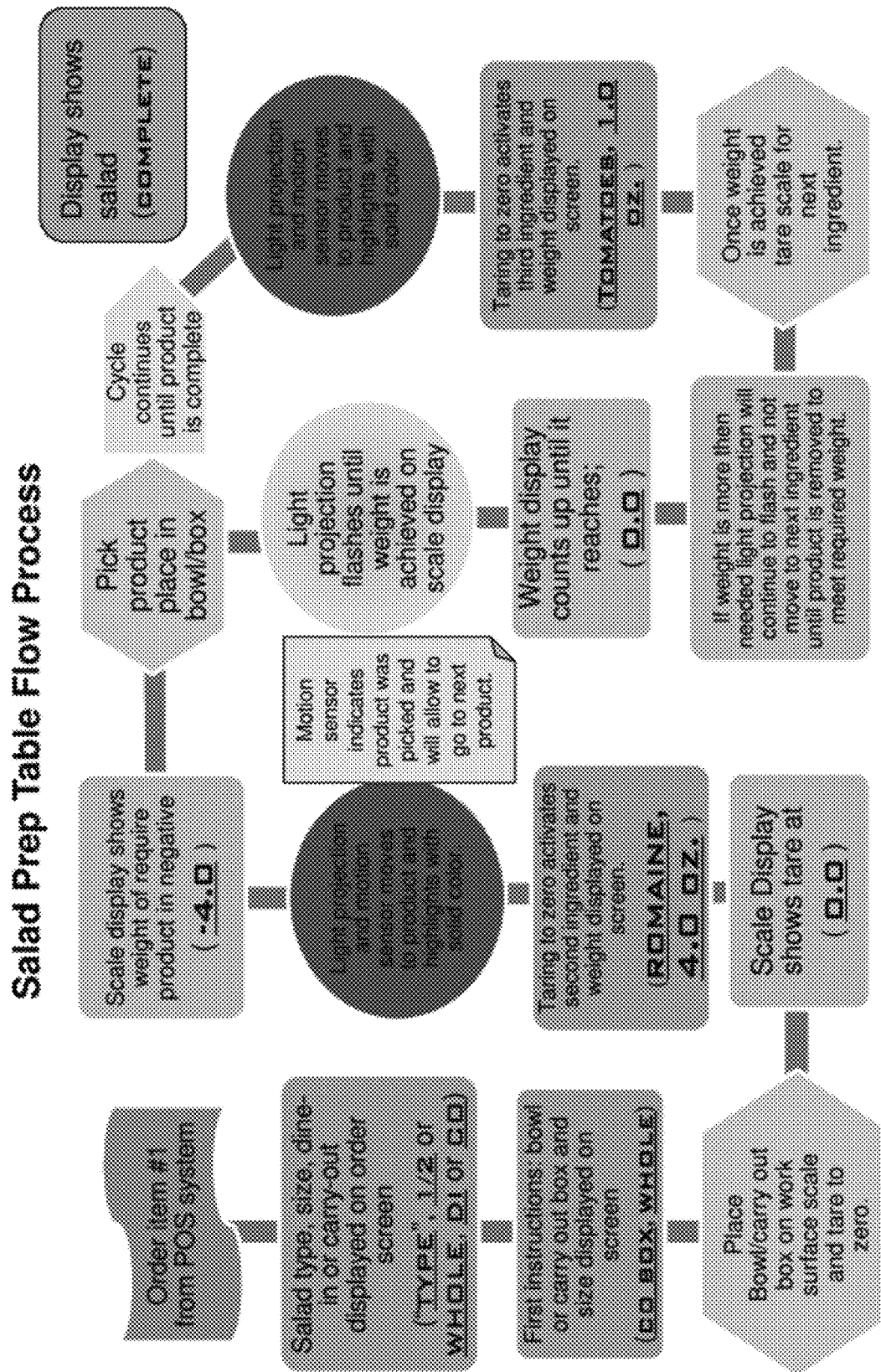
FIG. 20 is a flow diagram associated with a system and method of the present invention.
Figure 21:
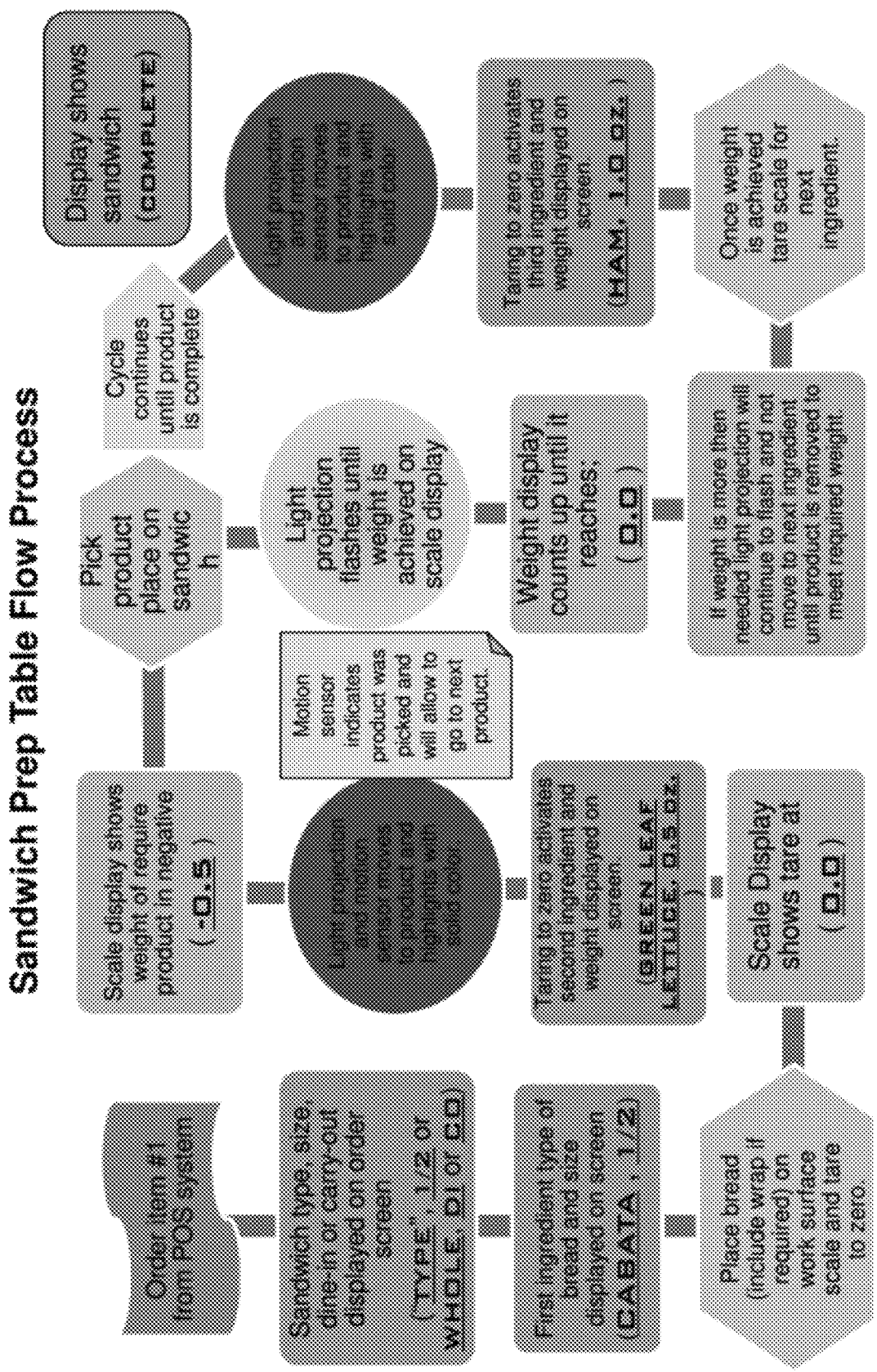
FIG. 21 is a flow diagram associated with a system and method of the present invention.

Referring generally to FIGS. 20-21, the present invention also includes a method of food item preparation. In some embodiments, the method utilizes a lighting system as described herein. In some embodiments, an order is placed at a point of sale system. In some embodiments, the food item details are displayed on a screen associated with the lighting system. In some embodiments, such details are type, size, dine-in, or dine-out details. In some embodiments, a first set of instructions are displayed on a screen. In some embodiments, such instructions include the first step of food preparation, such as bowl size or bread type. In some embodiments, a user places a bowl or bread onto a work surface with a built-in weight sensor. In some embodiments, a user then tares the weight sensor to zero. In some embodiments, taring to zero activates a second ingredient and weight to be displayed on screen. In some embodiments, a lighting system then moves a carriage 180 above a product located in a bin in an ingredient array. In some embodiments, this product is the next ingredient in a recipe associated with the order. In some embodiments, an accessory associated with the carriage 180 then illuminates the next ingredient in the recipe. In some embodiments, the system will then set the weigh sensor scale to show the weight of required ingredient as a negative value. In some embodiments, the user then manually removes the ingredient from the bin and adds the ingredient to the food item. In some embodiments, a motion sensor detects that the user has accessed the bin containing the ingredient. In some embodiments, the light accessory will flash until the weight sensor reads zero weight, indicating the standard amount of ingredient has been added. In some embodiments, if the weight of the ingredient is more than is called for by the recipe, the light projection will continue to flash until product is removed to meet the required weight. In some embodiments, the scale is then tared to zero to move to the next ingredient in the recipe. In some embodiments, this cycle repeats for each ingredient associated with a food product recipe until the recipe is completed. In some embodiments, once the recipe is completed the display screen indicates the item is completed. In some embodiments, the carriage 180 of the lighting system will return to a home position upon completion.

Referring generally to FIGS. 33-40, in some embodiments, the system involves a fixed multi-light selective illumination assembly. In some embodiments, the apparatus operates in a similar fashion as otherwise described herein to selectively light bins associated with ingredients. In some embodiments, the lighting is achieved through utilizing a plurality of spot lights. In some embodiments, the spot lights are in fixed positions above the bins. In some embodiments, the spot lights are housed in a light box assembly. In some embodiments, the light box assembly consists of a top cover, a spot lights bracket, a spot light cover, and spot lights. In some embodiments, the spot lights attach to a spot lights bracket in a pattern. In some embodiments, this pattern mirrors the positioning and layout of a corresponding bin layout below the light box assembly. In some embodiments, the spot lights are configured so that they can illuminate each bin in a layout while remaining fixed in their location in the light box assembly.

In some embodiments, such a fixed assembly is utilized to perform the various methods described herein. In some embodiments, the fixed assembly in configured to illuminate ingredients associate with bins below the assembly without the need to mechanical movement of the assembly. In some embodiments, an advantage of such a system is to minimize the moving components and sources of potential mechanical failure associated with a shuttle or rail system. In some embodiments, an advantage of such a fixed assembly is to eliminate travel time associated with mechanical movement of a light assembly.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. A food monitoring system comprising:
    a first sensor configured to sense a first value associated with a food item;
    an indication means configured for providing a quality indication associated with the first value;
    wherein said first sensor is integrated with said system such that said first sensor does not interfere with a user accessing the food item while sensing the first value;
    wherein said system is further configured for identifying whether said first value is associated with said food item or alternatively associated with a foreign object, wherein said food monitoring system associates said first value with said food item when said first value is within an expected value range, and said system associates said first value with said foreign object when said first value is outside of said expected value range;
    a warning system configured to generate a warning when said first value is associated with said food item and said first value is outside of a threshold range; and
    wherein said warning system is further configured to be disabled when said first value is associated with said foreign object to prevent a false warning.

2. The food monitoring system of claim 1, further comprising:
    a plurality of bins, each bin configured to hold food; and
    wherein said first sensor is configured to sense said first value associated with each said bin.

3. The food monitoring system of claim 2, wherein:
    said plurality of bins are configured for holding a plurality of different food items; and
    wherein said system is configured such that said expected value range and said threshold range are customizable for each different food item.

4. The food monitoring system of claim 2, further comprising:
    a carriage system configured for moving said first sensor relative to said plurality of bins, thereby facilitating sad sensing said first value associated with each said bin.

5. The food monitoring system of claim 1, further comprising:
    a display;

wherein said indication means is configured for displaying said quality indication on said display; and wherein said warning system is configured for displaying said warning on said display.

6. The food monitoring system of claim 5, wherein:

said display further comprises a visual display of a layout of a plurality of bins of said food monitoring system and a plurality of quality indications associated with said plurality of bins.

7. The food monitoring system of claim 1, wherein said first sensor comprises a temperature sensor.

8. The food monitoring system of claim 1, further comprising a second sensor configured to sense a second value associated with said food item.

9. The food monitoring system of claim 8, wherein:

said second sensor comprises a gas sensor; and said second value comprises a value associated with off-gassing.

10. The food monitoring system of claim 1, further comprising an optical sensor configured for detecting a visual quality indication of said food item.

11. The food monitoring system of claim 1, wherein said indication means comprises a lighting system configured for illuminating a particular color to provide said quality indication.

12. The food monitoring system of claim 1, wherein said warning comprises an audible warning.

13. The food monitoring system of claim 1, wherein said warning comprises a visual warning display.

14. The food monitoring system of claim 1, further comprising a communication system for transmitting information to a remote device, the remote device being in data communication with said food monitoring system.

15. A method of monitoring food comprising the steps of:

providing a first sensor;

said first sensor sensing a first value associated with a bin holding a food item;

a system processor identifying whether said first value is associated with said food item or alternatively associated with a foreign object, wherein said system processor associates said first value with said food item when said first value is within an expected value range, and said system processor associates said first value with said foreign object when said first value is outside of said expected value range;

an indication means providing a quality indication associated with said first value;

providing a warning system; and said system processor disabling said warning system when said first value is associated with a foreign object to prevent a false warning.

16. The method of claim 15, further comprising the step of:

generating a warning when said first value is associated with said food item and said first value is outside of a threshold range.

17. The method of claim 15, further comprising the step of:

said first sensor sensing said first value associated with a plurality of additional bins holding additional food items.

18. The method of claim 15, further comprising the step of:

adjusting said expected value range and said threshold range as appropriate for said food item.

19. The method of claim 15, further comprising the steps of:

providing a display; and displaying said quality indication on said display.

* * * * *

UNITED STATES PATENT AND TRADEMARK OFFICE
CERTIFICATE OF CORRECTION

| | |
|---|---|
| PATENT NO. | : 12,070,138 B2 |
| APPLICATION NO. | : 18/205975 |
| DATED | : August 27, 2024 |
| INVENTOR(S) | : Seiss et al. |

Page 1 of 1

It is certified that error appears in the above-identified patent and that said Letters Patent is hereby corrected as shown below:

In the Specification

In Column 6, Line 21, delete "bloc" and insert -- block --, therefor.

In Column 7, Line 20, delete "37" and insert -- 37. --, therefor.

Signed and Sealed this
Eighth Day of October, 2024

*Katherine Kelly Vidal*

Katherine Kelly Vidal
*Director of the United States Patent and Trademark Office*